US010040179B2

(12) United States Patent
Peters et al.

(10) Patent No.: US 10,040,179 B2
(45) Date of Patent: *Aug. 7, 2018

(54) FASTENER TOOL ASSEMBLIES

(71) Applicant: BLACK & DECKER INC., Newark, DE (US)

(72) Inventors: Michael P. Peters, Lutherville, MD (US); Mark E. Brunson, Bel Air, MD (US); Darren B. Moss, York, PA (US); David B. Lee, Baltimore, MD (US); Ruth E. Mitchener Keffer, Baltimore, MD (US)

(73) Assignee: Black & Decker Inc., New Britain, CT (US)

( * ) Notice: Subject to any disclaimer, the term of this patent is extended or adjusted under 35 U.S.C. 154(b) by 190 days.

This patent is subject to a terminal disclaimer.

(21) Appl. No.: 14/837,105

(22) Filed: Aug. 27, 2015

(65) Prior Publication Data
US 2015/0367486 A1 Dec. 24, 2015

Related U.S. Application Data

(63) Continuation of application No. 13/766,135, filed on Feb. 13, 2013, now Pat. No. 9,156,147.
(Continued)

(51) Int. Cl.
*B25B 23/00* (2006.01)
*B23B 31/22* (2006.01)
(Continued)

(52) U.S. Cl.
CPC .......... *B25B 23/0035* (2013.01); *B23B 31/10* (2013.01); *B23B 31/1071* (2013.01);
(Continued)

(58) Field of Classification Search
CPC ................. B25B 23/0035; B25B 23/12; Y10T 279/17411; Y10T 279/17752; Y10T 279/17794; Y10T 279/17811
See application file for complete search history.

(56) References Cited

U.S. PATENT DOCUMENTS 1,119,276 A 12/1914 Griffith et al.
1,124,981 A 1/1915 Weaver
(Continued)

FOREIGN PATENT DOCUMENTS

CN 202528113 U 11/2012
DE 2934428 A1 3/1981
(Continued)

OTHER PUBLICATIONS

Pothmann, Johannes—European Search Report re: European Patent Appln. No. 15 18 0953—dated Mar. 23, 2016—9 pages—The Hague.
(Continued)

*Primary Examiner* — David B Thomas
(74) *Attorney, Agent, or Firm* — Scott B. Markow

(57) ABSTRACT

A bit holder assembly for a rotary hand or powered tool, includes a body having a hex shank at its rearward end and a retraction collar slidably disposed on the body. The body has a coaxial hex socket formed therein to allow a tool bit to be inserted thereinto. A coil spring biases the retraction collar forwardly and biases a retaining clip toward the bottom of an angular slot formed in the body. The bit is removed by sliding the retraction collar rearwardly, to compress the coil spring and allow the retaining clip to retract back up the slot. A ring magnet is disposed at the forward end of the retraction collar to magnetize a fastener to retain the fastener to the bit.

26 Claims, 20 Drawing Sheets

Related U.S. Application Data

(60) Provisional application No. 61/599,222, filed on Feb. 15, 2012.

(51) Int. Cl.
   *B25B 23/12* (2006.01)
   *B23B 31/107* (2006.01)
   *B23B 31/10* (2006.01)

(52) U.S. Cl.
   CPC .............. *B23B 31/22* (2013.01); *B25B 23/12* (2013.01); *Y10T 279/17411* (2015.01); *Y10T 279/17752* (2015.01); *Y10T 279/17794* (2015.01); *Y10T 279/17811* (2015.01); *Y10T 279/32* (2015.01)

(56) References Cited

U.S. PATENT DOCUMENTS

| | | |
|---|---|---|
| 1,138,465 A | 5/1915 | Fegley et al. |
| 1,656,450 A | 2/1925 | Steuer |
| 1,860,998 A | 5/1932 | Drazick |
| 2,348,611 A | 5/1944 | Davidson |
| 2,409,899 A | 10/1946 | Resina |
| 2,522,217 A | 9/1950 | Fischer et al. |
| 2,524,095 A | 10/1950 | Williams |
| 2,671,484 A | 3/1954 | Clark |
| 2,677,294 A | 5/1954 | Clark |
| 2,762,408 A | 9/1956 | Baldwin |
| 2,933,114 A | 4/1960 | Bystrom |
| 3,007,504 A | 11/1961 | Clark |
| 3,019,027 A | 1/1962 | Klein et al. |
| 3,398,965 A | 8/1968 | Cox |
| 3,436,086 A | 4/1969 | Glenzer |
| 3,604,488 A | 9/1971 | Wishart |
| 3,707,894 A | 1/1973 | Stillwagon, Jr. |
| 3,726,533 A | 4/1973 | Lafferty, Sr. |
| 3,742,656 A | 7/1973 | Amos |
| 3,767,218 A | 10/1973 | Linthicum et al. |
| 3,788,658 A | 1/1974 | Benjamin et al. |
| 3,901,298 A | 8/1975 | Eby |
| 3,929,343 A | 12/1975 | Wanner et al. |
| 4,184,692 A | 1/1980 | Benson et al. |
| 4,309,042 A | 1/1982 | Fauth et al. |
| 4,317,578 A | 3/1982 | Welch |
| 4,577,875 A | 3/1986 | Miyakawa |
| 4,588,335 A | 5/1986 | Pearson, Jr. |
| 4,629,375 A | 12/1986 | Lieser |
| 4,669,932 A | 6/1987 | Hartley |
| 4,692,073 A | 9/1987 | Martindell |
| 4,787,278 A | 11/1988 | Bononi |
| 4,824,298 A | 4/1989 | Lippacher et al. |
| 4,858,939 A | 8/1989 | Riggs |
| 5,012,708 A | 5/1991 | Martindell |
| 5,013,194 A | 5/1991 | Wienhold |
| 5,056,387 A | 10/1991 | Cook |
| 5,062,749 A | 11/1991 | Sheets |
| 5,152,642 A | 10/1992 | Pitts et al. |
| 5,182,973 A | 2/1993 | Martindell |
| 5,188,378 A | 2/1993 | Erlenkeuser |
| 5,284,069 A | 2/1994 | Wellman |
| 5,385,420 A | 1/1995 | Newman, Sr. et al. |
| 5,398,946 A | 3/1995 | Quiring |
| 5,704,261 A | 1/1998 | Strauch et al. |
| 5,709,391 A | 1/1998 | Arakawa et al. |
| 5,709,393 A | 1/1998 | Von Keudell et al. |
| 5,724,872 A | 3/1998 | Shih |
| 5,724,873 A | 3/1998 | Hillinger |
| 5,868,047 A | 2/1999 | Faust et al. |
| 5,934,384 A | 8/1999 | Wang |
| 5,951,024 A | 9/1999 | Montjoy et al. |
| 5,988,957 A | 11/1999 | Wheeler |
| 5,992,274 A | 11/1999 | Lammers |
| 5,996,452 A | 12/1999 | Chiang |
| 6,053,675 A | 4/2000 | Holland et al. |
| 6,059,296 A | 5/2000 | Baeder |
| 6,074,140 A | 6/2000 | Cook |
| 6,082,233 A | 7/2000 | Han |
| RE36,797 E | 8/2000 | Eggert et al. |
| 6,126,370 A | 10/2000 | Wheeler |
| 6,148,699 A | 11/2000 | Han |
| 6,154,108 A | 11/2000 | Huang |
| 6,199,872 B1 | 3/2001 | Hasan |
| 6,209,426 B1 | 4/2001 | Takahashi |
| 6,224,303 B1 | 5/2001 | Wheeler et al. |
| 6,261,035 B1 | 7/2001 | Moores, Jr. et al. |
| 6,270,085 B1 | 8/2001 | Chen et al. |
| 6,311,989 B1 | 11/2001 | Rosanwo |
| 6,325,393 B1 | 12/2001 | Chen et al. |
| 6,341,926 B1 | 1/2002 | Liu |
| 6,343,901 B2 | 2/2002 | Wheeler et al. |
| 6,345,560 B1 | 2/2002 | Strauch et al. |
| 6,354,177 B2 | 3/2002 | Peters |
| 6,382,636 B1 | 5/2002 | Walker |
| 6,390,739 B1 | 5/2002 | O'Banion |
| 6,457,916 B2 | 10/2002 | Wienhold |
| 6,464,234 B2 | 10/2002 | Frauhammer et al. |
| 6,530,299 B1 | 3/2003 | Liu |
| 6,543,959 B1 | 4/2003 | Jore |
| 6,622,597 B2 | 9/2003 | Chen |
| 6,637,755 B2 | 10/2003 | Chen et al. |
| 6,651,990 B2 | 11/2003 | Higasi et al. |
| 6,666,114 B1 | 12/2003 | Lin |
| 6,684,740 B2 | 2/2004 | Lin |
| 6,695,321 B2 | 2/2004 | Bedi et al. |
| 6,698,319 B2 | 3/2004 | Huang |
| 6,722,667 B2 | 4/2004 | Cantlon |
| 6,834,864 B2 | 12/2004 | Girardeau |
| 6,840,143 B1 | 1/2005 | Lin |
| 6,860,489 B2 | 3/2005 | Chen |
| 6,863,280 B2 | 3/2005 | Chiu |
| 6,902,358 B2 | 6/2005 | Thomas |
| RE38,778 E | 8/2005 | Eggert et al. |
| 6,929,266 B2 | 8/2005 | Peters et al. |
| 6,931,967 B1 | 8/2005 | Chang |
| 6,973,858 B2 | 12/2005 | Huang |
| 6,986,517 B2 | 1/2006 | Lin |
| 7,063,332 B2 | 6/2006 | Mueller |
| 7,086,813 B1 | 8/2006 | Boyle et al. |
| 7,096,768 B1 | 8/2006 | Chen |
| 7,107,882 B1 | 9/2006 | Chang |
| 7,124,665 B1 | 10/2006 | Chen |
| 7,131,358 B2 | 11/2006 | Hsien |
| 7,159,493 B1 | 1/2007 | Huang |
| 7,214,009 B2 | 5/2007 | Quanz |
| 7,222,862 B2 | 5/2007 | Buchholz et al. |
| 7,250,023 B2 | 7/2007 | Bai |
| 7,261,023 B2 | 8/2007 | Taguchi |
| 7,278,342 B1 | 10/2007 | Chang |
| 7,284,936 B1 | 10/2007 | Rinner |
| 7,287,449 B2 | 10/2007 | Abel et al. |
| 7,290,470 B1 | 11/2007 | Peters |
| 7,306,396 B1 | 12/2007 | Chen et al. |
| 7,308,948 B2 | 12/2007 | Furuta |
| 7,316,404 B1 | 1/2008 | Walker |
| 7,380,612 B2 | 6/2008 | Furuta |
| 7,380,613 B2 | 6/2008 | Furuta |
| 7,387,051 B1 | 6/2008 | Chiang |
| 7,387,054 B2 | 6/2008 | Rajotte |
| 7,424,841 B2 | 9/2008 | Liu |
| 7,469,909 B2 | 12/2008 | Strauch et al. |
| D589,319 S | 3/2009 | Peters |
| 7,565,854 B2 | 7/2009 | Chiang et al. |
| 7,574,946 B1 | 8/2009 | Chiang |
| 7,597,031 B2 | 10/2009 | Chiang |
| 7,669,860 B2 | 3/2010 | Chiang |
| D615,380 S | 5/2010 | Su |
| 7,726,664 B2 | 6/2010 | Peters |
| 7,735,400 B2 | 6/2010 | Chen |
| 7,779,734 B2 | 8/2010 | Nichols, Jr. |
| D623,036 S | 9/2010 | DeBaker |
| D624,383 S | 9/2010 | Hsu |
| D627,205 S | 11/2010 | Hsu |
| 7,823,890 B2 | 11/2010 | Chen |

(56) References Cited

U.S. PATENT DOCUMENTS

| | | |
|---|---|---|
| D631,723 S | 2/2011 | DeBaker |
| 7,896,357 B2 | 3/2011 | Peters |
| 7,913,592 B2 | 3/2011 | Hu |
| 7,922,180 B2 | 4/2011 | Meng |
| 7,942,426 B2 | 5/2011 | Peters |
| D646,138 S | 10/2011 | Hsu |
| D646,139 S | 10/2011 | Hsu |
| D646,547 S | 10/2011 | DeBaker |
| D653,096 S | 1/2012 | Lucio et al. |
| D653,517 S | 2/2012 | Lucio et al. |
| 8,166,851 B2 | 5/2012 | Pohola et al. |
| 8,172,236 B2 | 5/2012 | Shibata |
| 8,176,817 B2 | 5/2012 | Liu |
| D662,802 S | 7/2012 | DeBaker |
| D663,187 S | 7/2012 | DeBaker |
| 8,262,097 B2 | 9/2012 | Lái |
| 8,366,120 B2 | 2/2013 | Hu |
| 8,413,996 B2 | 4/2013 | Hu |
| 8,418,587 B2 | 4/2013 | DeBaker |
| 8,493,931 B1 | 7/2013 | Nix |
| 8,636,287 B2 * | 1/2014 | Wienhold ............ B25B 23/0035 279/155 |
| 9,156,147 B2 * | 10/2015 | Peters .................... B23B 31/10 |
| 9,505,108 B2 * | 11/2016 | Peters .................... B25B 23/12 |
| 2002/0166421 A1 | 11/2002 | Bowerman |
| 2003/0025326 A1 | 2/2003 | Schulte |
| 2003/0145693 A1 | 8/2003 | Huang |
| 2004/0093997 A1 | 5/2004 | Huang |
| 2004/0164503 A1 | 8/2004 | Fan-Chiang et al. |
| 2004/0232631 A1 | 11/2004 | Chen et al. |
| 2005/0098002 A1 | 5/2005 | Holland-Letz |
| 2005/0166725 A1 | 8/2005 | Chen |
| 2006/0027057 A1 | 2/2006 | Hsien |
| 2006/0107801 A1 | 5/2006 | Hsien |
| 2006/0111723 A1 | 5/2006 | Chapolini et al. |
| 2006/0123957 A1 | 6/2006 | Hsien |
| 2007/0234856 A1 | 10/2007 | Liu |
| 2008/0184853 A1 | 8/2008 | Chen |
| 2008/0184854 A1 | 8/2008 | Peters |
| 2008/0216618 A1 | 9/2008 | Chen |
| 2009/0107304 A1 | 4/2009 | Chiang et al. |
| 2009/0139378 A1 | 6/2009 | Chiang et al. |
| 2009/0139379 A1 | 6/2009 | Chiang et al. |
| 2009/0165606 A1 | 7/2009 | Hsien |
| 2009/0174157 A1 | 7/2009 | Chang |
| 2009/0288525 A1 | 11/2009 | Chen |
| 2009/0314143 A1 | 12/2009 | Chen |
| 2010/0011918 A1 | 1/2010 | Ray |
| 2010/0133762 A1 | 6/2010 | Peters |
| 2010/0294092 A1 | 11/2010 | Hu |
| 2010/0307298 A1 | 12/2010 | Lai |
| 2011/0017029 A1 | 1/2011 | Chen |
| 2011/0023666 A1 | 2/2011 | Hsu |
| 2011/0167966 A1 | 7/2011 | Liu |
| 2011/0197721 A1 | 8/2011 | DeBaker |
| 2011/0215538 A1 | 9/2011 | Cornwell et al. |
| 2011/0283842 A1 | 11/2011 | Lai |
| 2012/0126497 A1 | 5/2012 | Lin |
| 2012/0267865 A1 | 10/2012 | Hsu |
| 2012/0272795 A1 | 11/2012 | Chen |
| 2012/0275875 A1 | 11/2012 | Gischus et al. |
| 2013/0220086 A1 | 8/2013 | Peters et al. |
| 2013/0328276 A1 | 12/2013 | Moss et al. |
| 2014/0333037 A1 * | 11/2014 | Peters .................... B25B 23/12 279/50 |

FOREIGN PATENT DOCUMENTS

| | | |
|---|---|---|
| DE | 3243389 A1 | 11/1982 |
| DE | 3907567 A1 | 9/1989 |
| DE | 4243650 A1 | 12/1992 |
| DE | 10148943 A1 | 11/2002 |
| DE | 202004004469 U1 | 5/2004 |
| DE | 202005013315 U1 | 10/2005 |
| DE | 102007012892 A1 | 12/2007 |
| DE | 202008003131 U1 | 9/2008 |
| DE | 102010016053 A1 | 2/2011 |
| DE | 202013008907 U1 | 1/2014 |
| DK | 200101378 A | 4/2002 |
| EP | 1878524 A2 | 1/2006 |
| EP | 1637285 A1 | 3/2006 |
| EP | 2151304 B1 | 3/2013 |
| FR | 2631275 A1 | 11/1989 |
| JP | 59-059278 U1 | 4/1984 |
| JP | 08-229840 | 10/1996 |
| JP | 2000024946 A | 1/2000 |
| JP | 2000127058 A | 5/2000 |
| JP | 2000296474 A | 10/2000 |
| JP | 200311641 A | 11/2003 |
| JP | 2004106473 A | 4/2004 |
| WO | WO-1991010541 A1 | 7/1991 |
| WO | WO-2002022314 A1 | 3/2002 |
| WO | 2012110453 A1 | 8/2012 |

OTHER PUBLICATIONS

Garella, Mario—European Search Report re: EP14180985—dated Sep. 8, 2015—8 pages—The Hague.
Screen shots of a bit holder with a floating ring magnet (2 pages).
Three (3) photographs of Vessel 2H drill bit with floating magnet sleeve (with packaging).
New Product Ideas/Inventions: Twist-Lok Drill & Drive System—Mar. 1 , 2007—=pages.
English Translation of JP-S59059278.
Pastramas, Nikolas—Extended European Search Report re: related patent application No. 13155401.6—dated Jan. 4, 2018—The Hague.

* cited by examiner

FASTENER TOOL ASSEMBLIES

CROSS-REFERENCE TO RELATED APPLICATIONS

This application is a continuation of U.S. patent application Ser. No. 13/766,135, filed Feb. 13, 2013, which claims the benefit of U.S. Provisional Application No. 61/599,222, filed Feb. 15, 2012. The entire disclosures of the above applications are incorporated herein by reference.

FIELD

The present disclosure relates to power tool and hand tool bits and bit holders and more particularly, to a bit and a quick change bit holder with a floating ring magnet for retaining a fastener to the bit.

BACKGROUND

This section provides background information related to the present disclosure which is not necessarily prior art.

Auxiliary chucks for power and hand tools have become increasingly common, especially as the need and desirability of wider versatility in the use of power tools and hand tools has increased. Such auxiliary chucks allow the hand or power tool to be used with any of a number of interchangeable bits. This, in turn, has resulted in demands for greater speed, convenience and ease of insertion and removal of tool bits from such chucks.

In one exemplary type of such conventional quick-release chucks, one or more detent balls are positioned within a hollow, barrel-shaped tool bit holder body and are resiliently biased into engagement with a circumferentially-extending groove or recess on the shank of the tool bit. An example of such a ball-type mechanism is disclosed in commonly assigned U.S. Pat. No. 5,988,957 which is herein incorporated by reference. In other conventional quick release chucks, a spring biased clip is used to engage the bit within the tool bit holder body. Examples of the spring biased clip design are disclosed in commonly assigned U.S. Pat. Nos. 7,086,813 and 6,929,266 which are herein incorporated by reference.

SUMMARY

This section provides a general summary of the disclosure, and is not a comprehensive disclosure of its full scope or all of its features.

Although the above types of bit holders have been found to function acceptably, the present disclosure provides a simple, relatively inexpensive quick-acting chuck assembly or bit holder that includes a ring magnet at a forward end of the retraction collar to magnetize a fastener and assist in both retaining the fastener to the bit and stabilizing the fastener during its installation. The ring magnet can be supported to allow the magnet to float in a forward direction to engage the fastener or a rearward direction to release the bit for a rapid one handed bit change. The length of the float and the geometry of the magnet are such as to allow for the feature to work with fasteners of different head configurations and with all bit lengths within the normally accepted industry tolerances.

The present disclosure provides a body having a coaxially extending hex-shaped bore therein for receiving a hex-shaped bit. A spring biased retraction collar is mounted to the body and engages means for releasably retaining the hex-shaped tool within the bore. The retraction collar supports a magnet at a forward end thereof and allows the magnet to float in a forward direction to engage and magnetize a fastener engaging the bit. The magnet can be in the form of a ring magnet and can be fixedly mounted to the retraction collar, wherein the magnet causes the retraction collar to move in the forward direction. Alternatively, the retraction collar can include a floating sleeve that supports the magnet and allows the magnet to float forward relative to a remainder of the retraction collar.

According to further aspects of the present disclosure, a bit holder is provided with a floating ring magnet supported on the bit holder. The bit holder can be a pivoting bit holder or a multi-tool bit holder such as a six-in-one rotary tool.

According to a still further aspect of the present disclosure, a tool bit is provided with a floating sleeve that supports a ring magnet at a forward end of the tool bit. The floating sleeve can be supported on the tool bit by various techniques as will be disclosed herein. The tool bit can be a torsion bit that includes a shank portion and a working region with a reduced diameter torsion zone disposed therebetween. The reduced diameter torsion zone has a shoulder on a forward and rearward end of the torsion zone to aid in retaining the floating sleeve on the tool bit.

According to another aspect, a magnet assembly is provided for retaining a fastener on a tool bit, the magnet assembly including a floating sleeve and a first ring magnet disposed at a front end portion of the floating sleeve. A second ring magnet is disposed at a rear end portion of the floating sleeve, wherein the first and second ring magnets are arranged with their poles opposing one another such that the floating sleeve is moveable freely along a length of the tool bit, and the first ring magnet is configured to engage a head of a fastener. The first and second ring magnets are disposed approximately 10 mm apart from each other and can include an O-ring disposed inside of the sleeve between the first and second ring magnets to resist movement of the floating sleeve along the tool bit.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
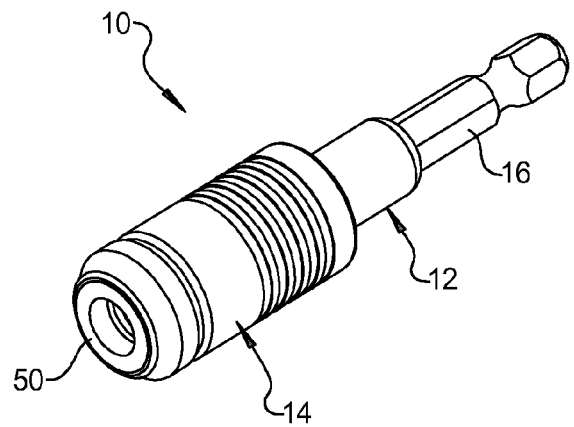
FIG. 1 is a perspective view of a bit holder assembly according to the principles of the present disclosure.

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Figure 2:
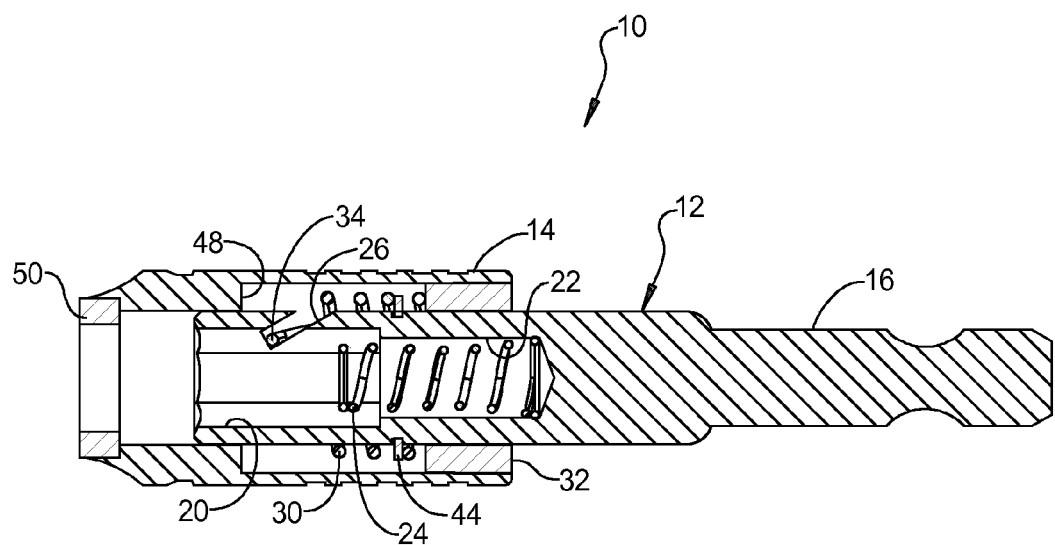
FIG. 2 is a longitudinal or axial cross-sectional view of the bit holder assembly of FIG. 1.

With reference to FIGS. 1-5, a first embodiment of the quick-change bit holder 10, according to the principles of the present disclosure, will now be described. The bit holder 10 includes a body 12 and retraction collar 14 slidably mounted on the body and retained in place by a sleeve bushing 32, as illustrated in FIG. 2. The body 12 can include a hex or polygonal-shaped shank 16 for mounting the bit holder 10 for rotation by a hand tool or a power tool.

With reference to FIG. 2, the body 12 also includes a hex or polygonal-shaped socket or bore 20 with the bore 20 opening axially outwardly toward the front or forward end of the bit holder 10. A plunger bore 22 extends axially from the hex-shaped socket or bore 20 toward the rear end of the bit holder assembly 10. Optionally, an ejection spring 24 can be disposed in the plunger bore 22. The body 12 includes an angular slot 26 formed transversely therein, with the slot 26 extending from the radially outer surface of the body 12 in an axially forward and radially inward direction to communicate with the interior of the hex bore or socket 20.

Figure 3:
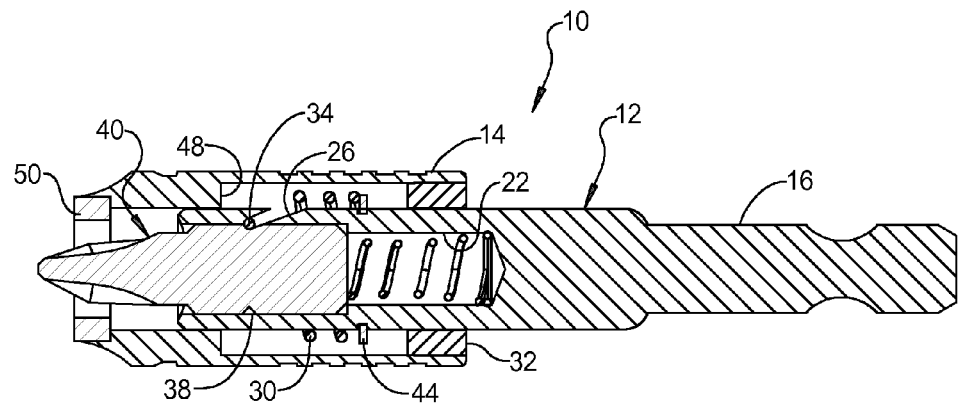
FIG. 3 is a longitudinal cross-sectional view similar to that of FIG. 2, but illustrating a tool bit fully inserted in the bit holder assembly.

A coil spring 30 surrounds a portion of the body 12 and is disposed between the body 12 and the retraction collar 14. The coil spring 30 abuttingly engages a clip 44 which is received in a groove around a mid-portion of the body 12 and terminates in an integrally formed clip 34 that is disposed in the angular slot 26 and is designed to releasably engage a recess 38 in a hex or polygonal-shaped bit tip 40 as illustrated in FIG. 3. An internal annular sleeve 32 attaches to the rear portion of the retraction collar 14. The sleeve 32 can be secured to the collar 14 by adhesive, a press fit, thermal bonding, fasteners, pins, or other known attachment techniques. Received in a groove around a mid-portion of the body 12 is a clip 44 that acts as a stop against the sleeve 32 to limit forward travel of the retractable collar 14. The retractable collar 14 includes a forward shoulder portion 48 that, when pulled rearward, can engage the spring 30 and pull the clip portion 34 of the spring 30 pulling it rearward out of engagement with a bit 40 received in the hex-shaped cavity 20.

The retractable collar 14 is of a non-magnetic material with the exception of a magnetic tip 50 that can be in the form of a ring magnet. Alternative magnetic arrangements can be used including multiple non-ring shaped magnets combined to form a ring-like shape mounted at the tip of the collar 14. Both faces and the internal bore of the magnet, however, may remain accessible.

Figure 4:
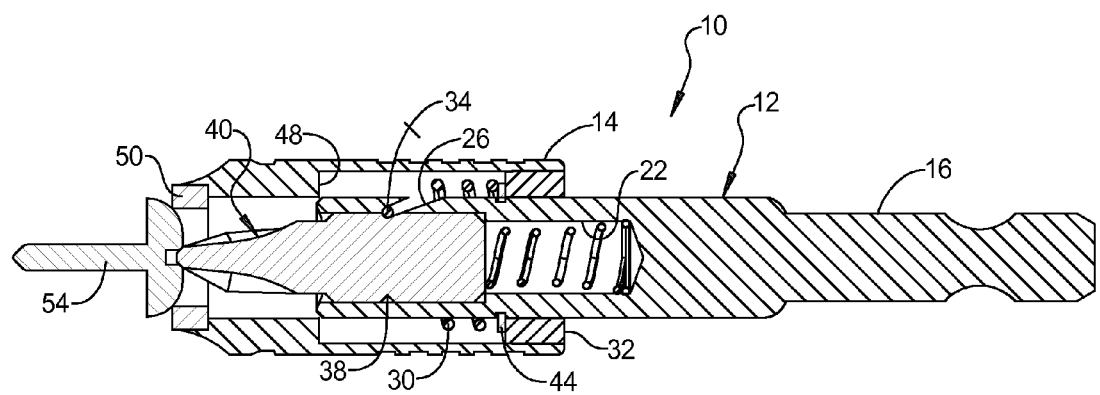
FIG. 4 is a longitudinal cross-sectional view similar to that of FIG. 3, but illustrating a fastener engaged with the tool bit and the retraction sleeve moved forward for magnetically engaging the fastener.

In operation, as shown in FIG. 2, the collar 14 starts in a neutral position with the collar biased forward and the spring clip 34 extending into the bore 20. Next, as shown in FIG. 3, a bit 40 is inserted into the bore 20 so that the spring clip 34 engages a notch 38 in the side of the bit 40 to prevent removal of the bit 40 from the bore 20. The bit 40 also compresses the ejection spring 24. The retraction collar 14 remains in the neutral position. Next, as shown in FIG. 4, when the bit 40 is used to drive a screw or fastener 54, the collar 14 floats as a result of the magnetic force radiating from the outer face to a forward position until the outer face of the magnet 50 reaches the fastener, enabling the outer face of the ring magnet 50 to magnetically adhere to the screw 54. This occurs before the bearing sleeve 32 engages the stop ring 44. The magnetic force, generating from the inner face of the magnet 50 by design, then draws the fastener 54 and the sleeve 14 jointly towards the body 12, the material of which it is made exhibiting magnet attractable properties resulting in holding the fastener 54 tight against the bit 40. The outer face of the magnet 50 also provides a stable surface to reduce movement of the fastener (wobble) during installation. The surface geometry of the face of the magnet 50 being such as to provide support to fasteners of multiple sizes, shapes, and configurations.

Figure 5:
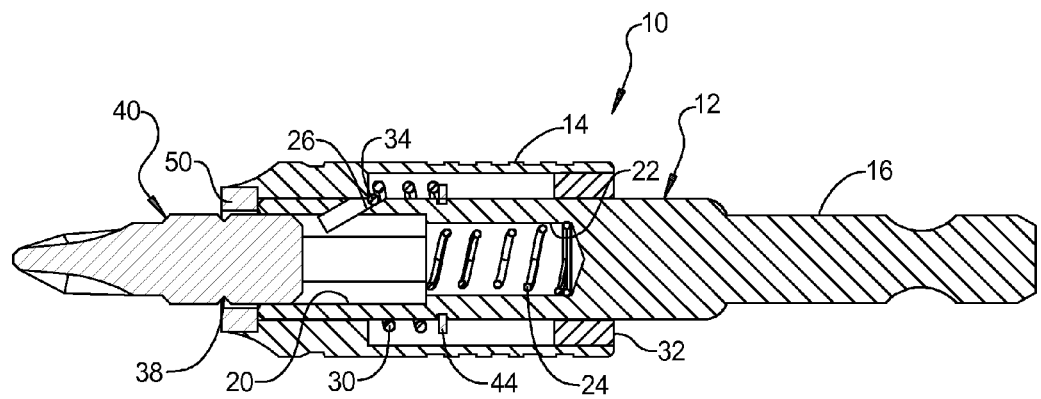
FIG. 5 is a longitudinal cross-sectional view similar to that of FIG. 2, but illustrating the retraction collar pulled rearward and the tool bit being removed from the bit holder assembly.

Next, as shown in FIG. 5, when the operation has finished and the user desires to remove the bit 40 from the bit holder 10, the user retracts the retraction collar 14 relative to the body 12, causing the spring 30 to compress, and the spring clip 34 to disengage from the bit 40, which allows the ejection spring 24 to attempt to eject the bit 40 from the holder 10. The ejection is, however, limited in movement to the point where the bit notch 38 is clear, and remains as such, of the clip 34 allowing for easy one handed removal, but not to the point where it leaves the bore 20. This controlled ejection is accomplished as a result of the magnetic field generating from the inner bore of the magnet 50 surrounding the bit 40.

Figure 6:
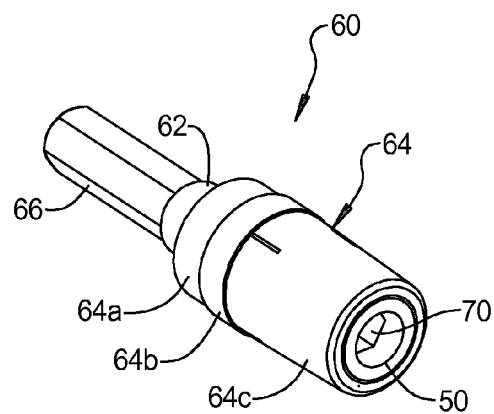
FIG. 6 is a perspective view of an alternative bit holder assembly according to the principles of the present disclosure.
Figure 7:
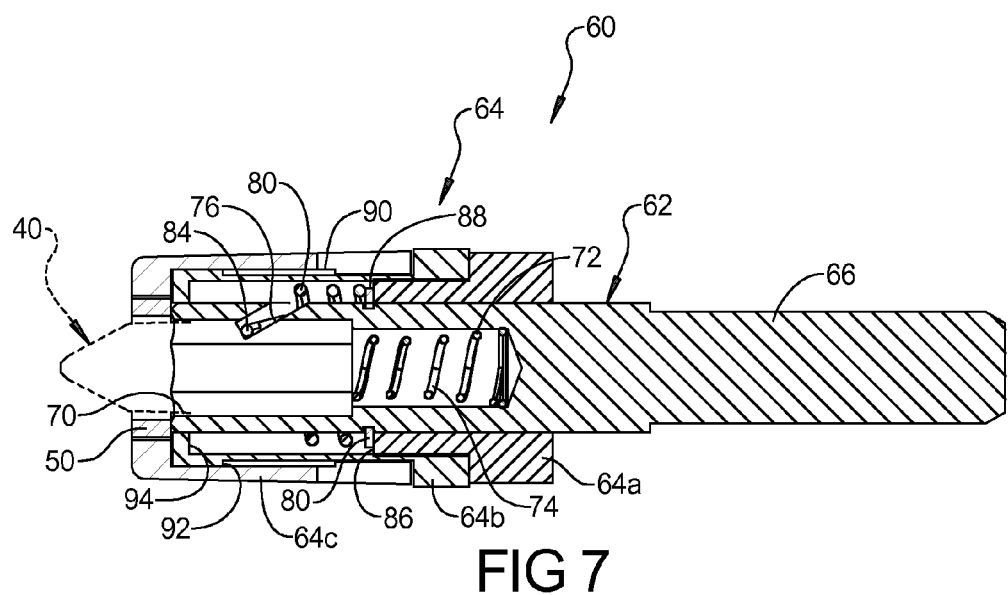
FIG. 7 is a longitudinal or axial cross-sectional view of the bit holder assembly of FIG. 6.

With reference to FIGS. 6 and 7, an alternative quick change bit holder 60, according to the present disclosure, will now be described. The bit holder 60 includes a body 62 and a retraction collar assembly 64 mounted thereon. The body 62 includes a hex shank 66 and a hex-shaped socket or bore 70 formed in the body 62, with the bore 70 opening axially outwardly toward the front or forward end of the bit holder assembly 60. A plunger bore 72 extends axially from the hex-shaped socket or bore 70 toward the rear end of the bit holder assembly 60. Optionally, an ejection spring 74 can be disposed in the plunger bore 72. The body 62 includes an angular slot 76 similar to the slot 26 as described above. A coil spring 80 having an integral spring clip 84 surrounds the body 62 and is disposed between the body and the clip 84 such that the spring clip 84 is disposed in the angular slot 76 for engaging a bit tip 40 in the manner as discussed above with regard to the previous embodiment.

The retraction collar assembly 64 includes a rear collar 64a, an intermediate collar 64b and a forward collar 64c. A retainer clip 86 is disposed in a recessed groove in the outer surface of the body 62 and is disposed against a forward facing shoulder 88 of the rearward collar 64a. The intermediate collar 64b is press fit onto the rearward collar 64a to trap the retainer clip 86 therebetween. A rearward facing shoulder 90 is provided in a forward direction from the spring 80 on the intermediate collar 64b. The forward collar 64c is slidably supported on a forward end of the intermediate collar 64b and includes a magnetic tip 50 in the form of a magnet ring. The forward collar 64c acts as a floating sleeve and includes a rearward shoulder portion 90 that engages a forward shoulder portion 92 of the intermediate collar 64b to limit the forward travel of the forward collar 64c. The rear end of the forward collar 64c can be stretched over the forward end of the intermediate collar 64b to complete the collar assembly 64. Slots can be provided in the rear end of the forward collar 64c to facilitate assembly on the intermediate collar 64b. Alternatively, the collar could be retained through the usage of a spring ring mounted in a groove on the OD of the intermediate collar 64b and a mating taper and groove in the ID of the forward collar 64c.

In operation, a bit tip 40 can be inserted into the hex-shaped bore 70 of the bit holder body 62. The spring clip 84 engages a recess 38 in the bit tip 40 in order to retain the bit tip 40 within the bore 70. The forward collar 64c is able to float in a forward direction to engage a fastener that is engaged by the bit tip 40 in order to magnetically retain the fastener to the bit tip 40. When the fastener is inserted and the user wishes to remove the bit tip 40, the retraction collar 64 can be pulled in a rearward direction so that rearward facing shoulder 94 of intermediate collar 64c pulls rearward on the spring 80 to disengage the spring clip portion 84 from the recess 38 in the bit tip 40. The magnetic sleeve on this bit holder 60 works just like the other in that it grabs the screw and pulls it back towards the body 62 and against the bit while reducing wobble.

Figure 8:
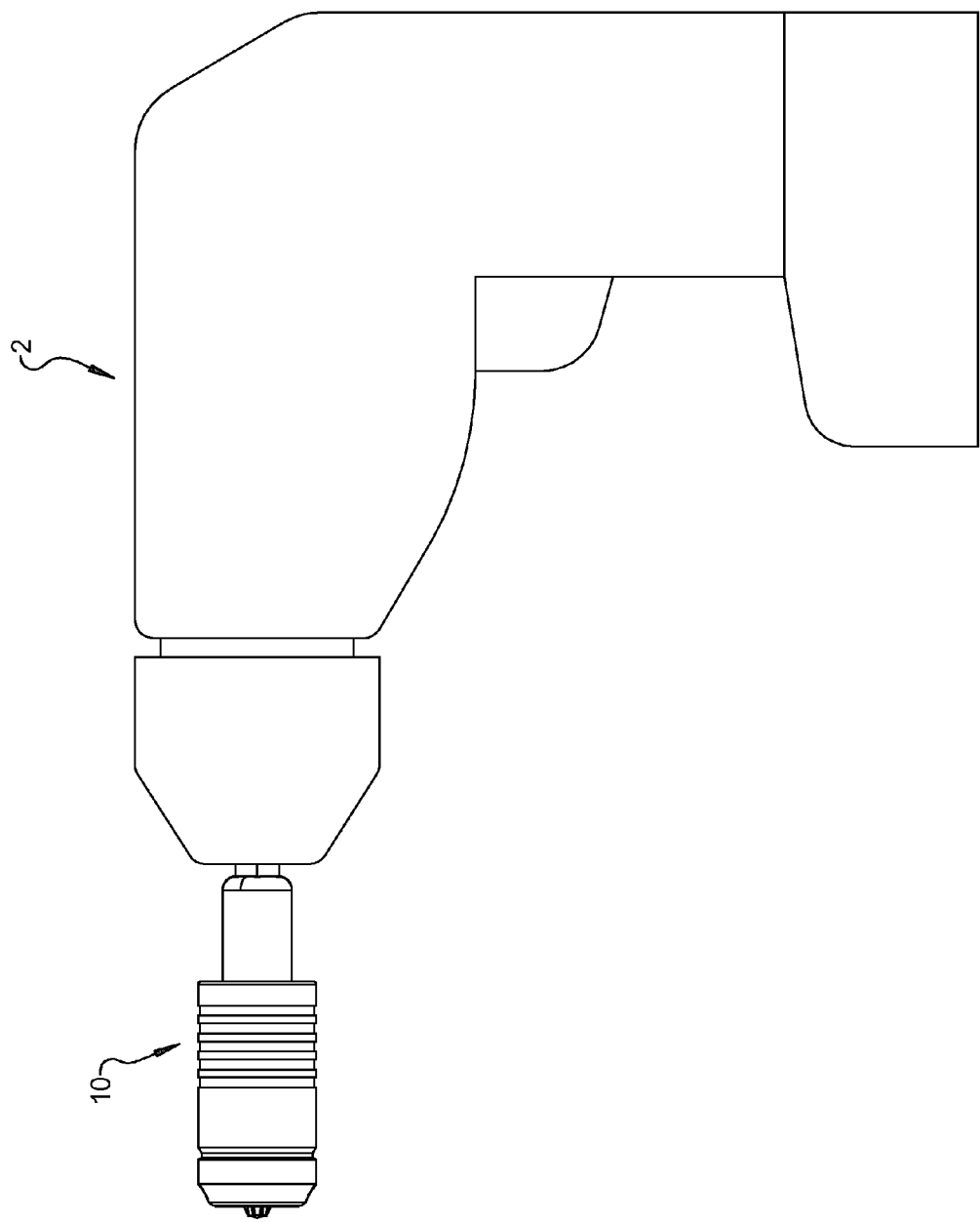
FIG. 8 is a side view of a power tool with the bit holder assembly of the present disclosure mounted therein.
Figure 9:
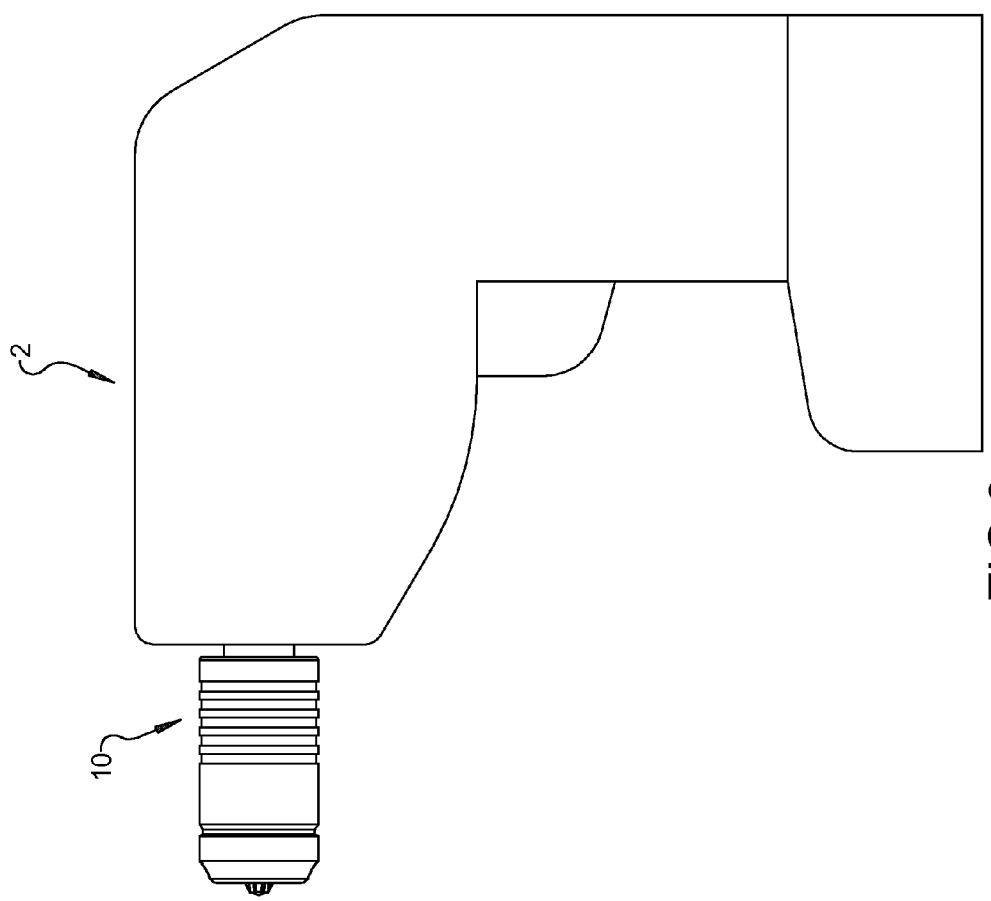
FIG. 9 is a side view of a power tool with the bit holder assembly integrally formed therein.

It should be understood that in each of the embodiments described herein, the bit holder 10, 60 can be mounted to a drill 2 as shown in FIG. 8 by inserting the hex-shaped shank 16, 66 into a chuck device. Alternatively, the bit holder of the present disclosure can be integrally constructed into the chuck device of the power tool 2, as shown in FIG. 9. Furthermore, although the present disclosure discloses a spring clip 34, 84 that is integral with the spring 30, 80, other arrangements of spring clips that are separate from the coil spring have also been utilized and can be utilized with the present disclosure. Examples of other arrangements include U.S. Pat. Nos. 7,086,813; 6,929,266; 6,261,035; 6,261,035, and 5,988,957 which are incorporated herein by reference in their entirety. Furthermore, the use of a ball detent mechanism is also known in the art, and can be used in place of the integral spring clip and spring arrangement of the present disclosure. Further, other previous bit holder designs can be modified to include a ring magnet near the front of the outer actuation sleeve to allow the magnet and/or actuation sleeve to float forward to magnetize a fastener during operation.

Figure 10:
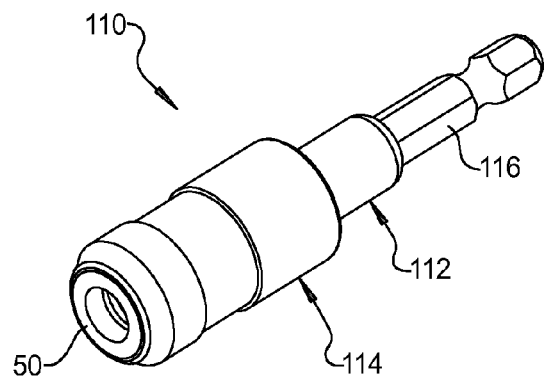
FIG. 10 is a perspective view of a bit holder assembly according to a third embodiment.
Figure 11:
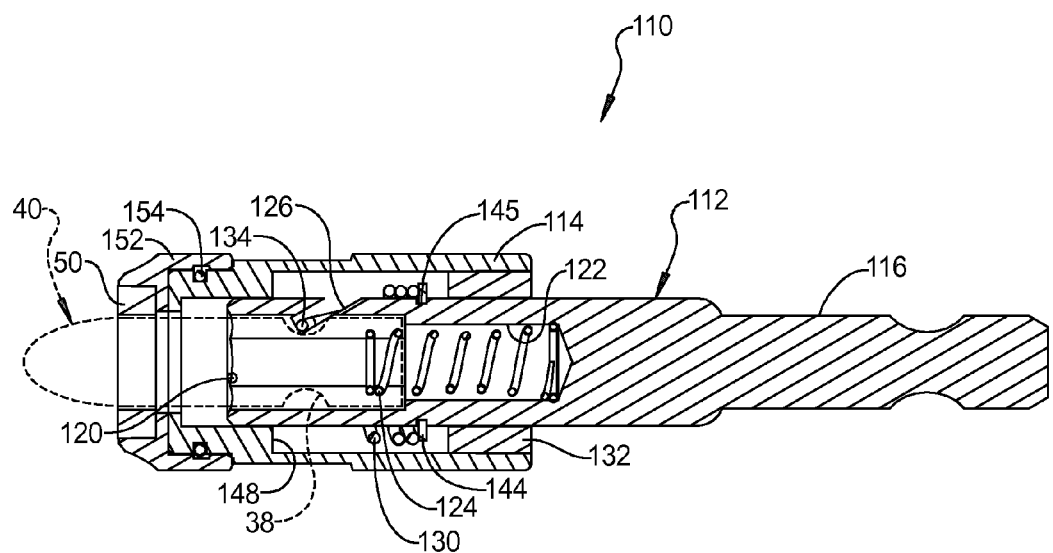
FIG. 11 is a cross-sectional view of the bit holder assembly of FIG. 10.

With reference to FIGS. 10 and 11, a third embodiment of the quick-change bit holder 110, according to the principles of the present disclosure, will now be described. The bit holder 110 includes a body 112 and a retraction collar 114 slidably mounted on the body 112 and retained in place by a sleeve bushing 132, as illustrated in FIG. 11. The body 112 can include a hex or polygonal-shaped shank 116 for mounting the bit holder 110 for rotation by a hand tool or a power tool.

With reference to FIG. 11, the body 112 also includes a hex or polygonal-shaped socket or bore 120 with the bore 120 opening axially outwardly toward the front end of the bit holder 110. A plunger bore 122 extends axially from the hex-shaped socket or bore 120 toward the rear end of the bit holder assembly 110. Optionally, an ejection spring 124 can be disposed in the plunger bore 122. The body 112 includes an angular slot 126 formed transversely therein, with the slot 126 extending from the radially outward surface of the body 112 in and axially forward and radially inward direction to communicate with the interior of the hex bore or socket 120.

A coil spring 130 surrounds a portion of the body 112 and is disposed between the body 112 and the retraction collar 114. The coil spring 130 abuttingly engages a clip 144 which is received in a groove 145 around a mid-portion of the body 112 and terminates as an integrally formed clip 134 that is disposed in the angular slot 126 and is designed to releasably engage a recess 38 in a hex or polygonal-shaped bit tip 40 in the same manner as the embodiment illustrated in FIGS. 3 and 4. The internal annular sleeve 132 attaches to the rear portion of the retraction collar 114. Sleeve 132 can be secured to the collar 114 by adhesive, a press fit, thermal bonding, fasteners, pins, or other known attachment techniques. The clip 144 acts as a stop against the sleeve 132 to limit for travel of the retractable collar 114. Retractable collar 114 includes a forward shoulder portion 148 that when pulled rearward can engage the spring 130 and pull the clip portion 134 of the spring 130, pulling it rearward out of engagement with a bit 40 received in the hex-shaped cavity 120.

Retractable collar 114 supports a removable magnet ring 150 that is supported by a removable sleeve 152. Removable sleeve 152 is secured to the retractable collar 114 by a retainer such as an O-ring or bull nose ring 154 that is received in a groove in a forward portion thereof. The sleeve 152' is press fit over top of the retainer ring in order to releasably secure the sleeve 152 to the retraction collar 114.

The operation of the bit tip holder 110 as described is the same as the bit tip holder 10 as described above.

Figure 12:
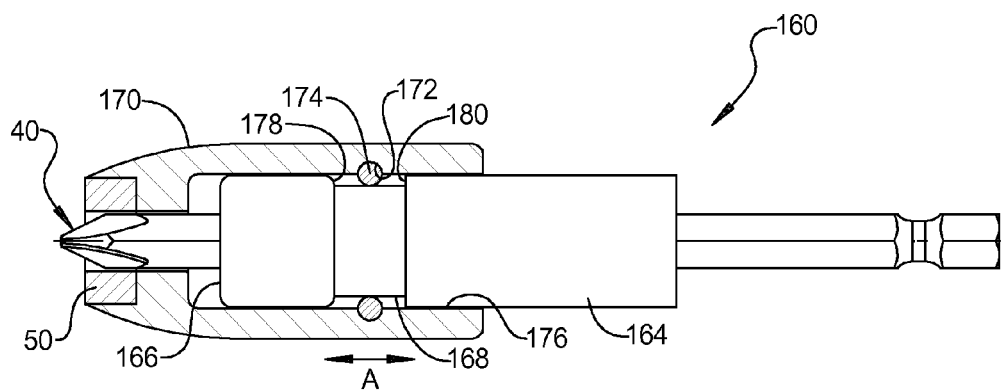
FIG. 12 is a partial cross-sectional view of a bit holder assembly according to an alternative embodiment.
Figure 13:
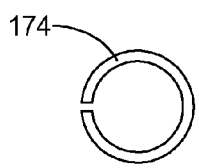
FIG. 13 is a plan view of a hog ring type retainer utilized in the embodiment of FIG. 12.
Figure 14:
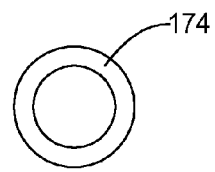
FIG. 14 is a plan view of a rubber O-ring that can be utilized in the embodiment of FIG. 12.

With reference to FIG. 12, a bit holder 160 is shown including a hex-shaped or polygonal-shaped shank 162 and a body portion 164 including a hex-shaped or polygonal-shaped bore 166 in an end thereof for receiving a bit 40. The outer surface of the body 164 is provided with an elongated annular recess 168. A floating sleeve 170 is provided on the end of the body 164 and supports a ring magnet 50 at an end thereof. The floating sleeve 170 includes an interior annular groove 172 that receives a retainer 174 therein. The floating sleeve 170 can be removably attached to the body 164 by force fitting the body 164 into a rear opening 176 of the floating sleeve 170 until the retainer 174 is received in the recess 168 of the body 164. The recess 168 is provided with a forward shoulder 178 and a rearward shoulder 180 that allow the floating sleeve 170 to travel in a forward and rearward direction as indicated by arrow A while the shoulders 178 and 180 limit the travel of the floating sleeve 170 by engagement with the retainer member 174. As shown in FIGS. 13 and 14, the retainer 174 can take the form of a steel hog ring, as shown in FIG. 13, or a rubber O-ring as shown in FIG. 14.

Figure 15:
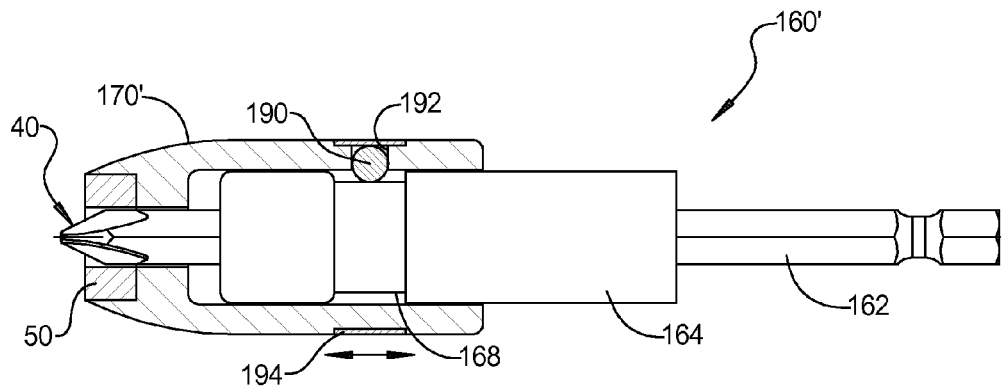
FIG. 15 is a partial cross-sectional view of a bit holder according to a further embodiment according to the principles of present disclosure.
Figure 16:
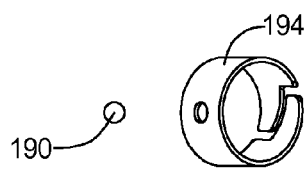
FIG. 16 is a perspective view of a ball and spring band which are utilized according to the alternative embodiment shown in FIG. 15.

As an alternative, as illustrated in FIG. 15, the bit holder 160' can use an alternative retainer in the form of a ball 190 which can be received in an opening 192 in the floating sleeve 170' and can be retained therein by an annular spring band 194 that can be made of steel or plastic or other suitable material. In operation, the bit holder 160, 160' can be used to engage a fastener via the tool bit 40 and the floating sleeve 170, 170' allows the ring magnet 50 to move forward under its magnetic force to engage the fastener and magnetize the fastener to improve the retention of the fastener with the tool bit 40.

Figure 17:
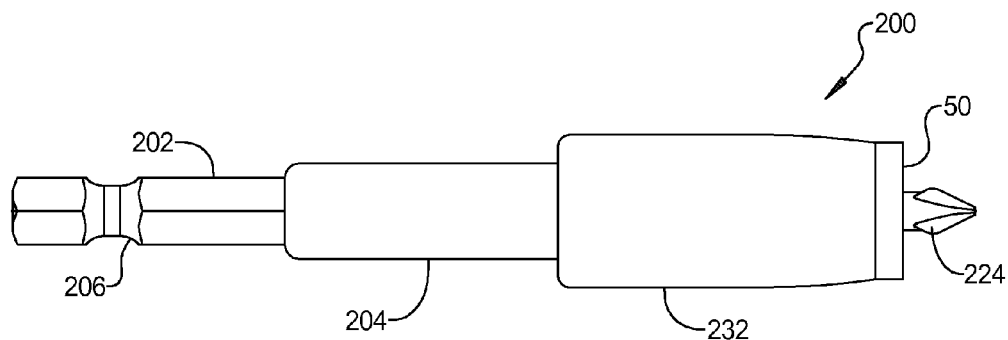
FIG. 17 is a side plan view of a six-in-one rotary tool having a floating ring magnet according to the principles of the present disclosure.
Figure 18:
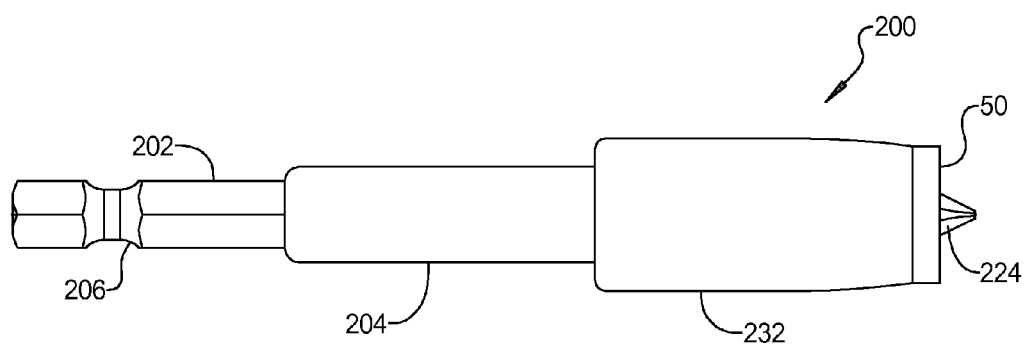
FIG. 18 is a side plan view of the six-in-one rotary tool shown in FIG. 17 with the ring magnet in a forward position.
Figure 19:
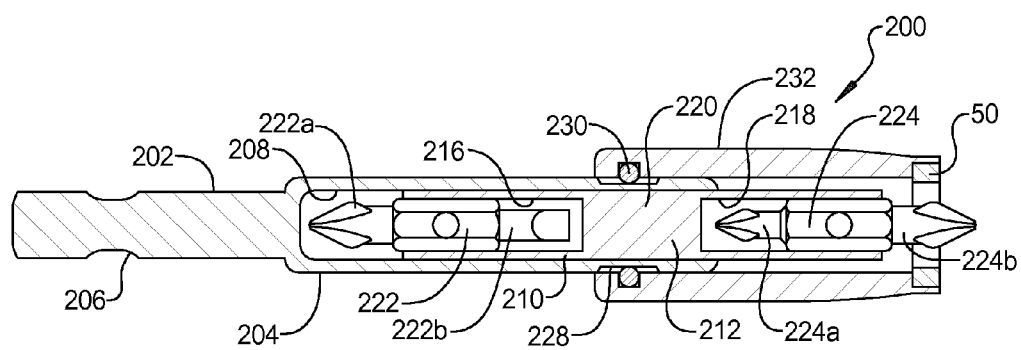
FIG. 19 is a cross-sectional view of the six-in-one rotary tool and floating ring magnet as shown in FIGS. 17 and 18.

In a still further alternative embodiment of the bit holder, as shown in FIGS. 17-19, the bit holder 200 can be configured as a six-in-one rotary tool that includes a floating ring magnet 50. In particular, as illustrated in FIG. 19, the tool holder 200 includes a shank 202 that is integral with, and that extends rearwardly from a socket 204. Shank 202 is preferably hex-shaped or polygonal and includes a circumferential groove 206. The tool socket 204 includes a bore 208 that extends axially from the socket end and that is also preferably hex-shaped or polygonal. A reversible bit assembly 210 is received in the bore 208 and includes a sleeve 212 having a pair of axial storage cavities 216, 218 separated by a web 220. The sleeve 212 receives a first and a second bit driver 222, 224 therein. The outer surface of the sleeve 212, each of the cavities 216, 218, as well as a center section of the first and second bit drivers 222, 224 are each again preferably hex-shaped or polygonal such that each of the bit drivers 222, 224 rotate with the sleeve 212 and socket 204.

Each of the first and second bit drivers 222, 224 are reversible within their respective cavities such that either of the bit ends 22a, 22b, 224a, 224b of the first and second bit drivers 222, 224 can extend from the sleeve 212. Additionally, sleeve 212 is reversible within the socket bore 208 such that either the first or second bit drivers 222, 224 operably extend from the socket 204. Accordingly, the tool may be configured such that any of the four bit driver ends 222a, 222b, 224a, 224b operably project from the socket 204. Either of the bit drivers 222, 224 may be removed from the sleeve 212 to expose the hex-shaped cavity 216, 218 for use as a nut driver. Finally, the tools sixth driver is provided by removing the reversible bit assembly 210 from the socket bore to expose the hex-shaped bore 208 for use as a second nut driver. It is noted that the bore 208 is larger than the cavities 216, 218 thereby providing the ability to accommodate larger hex-shaped screw heads or nuts. In a preferred embodiment, the bore 208 is a ⁵⁄₁₆ inch hex-opening while the cavities 216, 218 are each ¼ inch hex openings.

Similar to the above embodiments, the outer surface of the socket 204 can be provided with an elongated annular recess 228 that can be engaged by a retainer 230 of a floating sleeve 232 that supports a ring magnet 50 at a forward end thereof. Accordingly, as the tool holder 200 is used to engage a fastener, one of the bit drivers 222, 224 engage the fastener and the floating sleeve 232 allows the ring magnet 50 to move in a forward direction to engage the fastener to secure the fastener to the bit driver 222, 224. The floating sleeve 232 can be removed by applying a slight force in a forward direction to overcome the retaining force of the retainer 230 within the elongated annular recess 228. Upon removal of the floating sleeve 232, the reversible bit assembly 210 can be removed from the socket 204 so that the bit drivers 222, 224 can be chosen for use.

Figure 20:
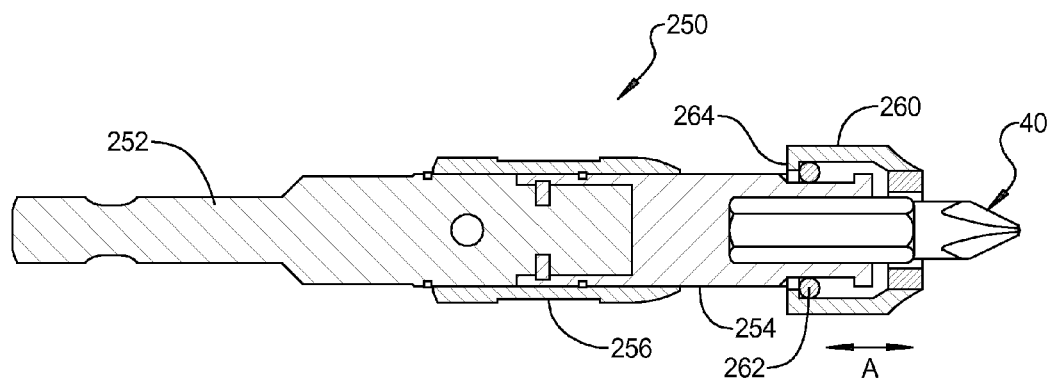
FIG. 20 is a cross-sectional view of a pivotal bit holder accessory having a floating ring magnet mounted on a forward end thereof.

With reference to FIG. 20, a pivotal/rigid accessory 250 for power and hand tools is disclosed and includes a drive component 252 adapted to be connected to a power tool or hand tool and a driven component 254 that is pivotally connected to the drive component 252. A locking sleeve 256 is provided for securing the driven component 254 for non-pivotal movement relative to the drive component 252, or the locking sleeve 256 can be moved to a disengaged position that allows the driven component 254 to pivot relative to the drive component 252. A pivot mechanism of this type is disclosed in U.S. Pat. No. 7,942,426, which is herein incorporated by reference. According to the principles of the present disclosure, a floating sleeve 260 can be provided at the forward end of the driven component 254 and supports a magnetic ring 50 at a forward end thereof to aid in retaining a fastener on a bit 40 received in a hex-shaped bore in the driven component 254. As illustrated in FIG. 20, the floating sleeve can include a retainer 262 that can be received in an elongated annular recess 264 on the outer surface of the driven component 254 to allow the floating sleeve 260 to move in a forward and rearward axial direction as indicated by arrow A.

Figure 21:
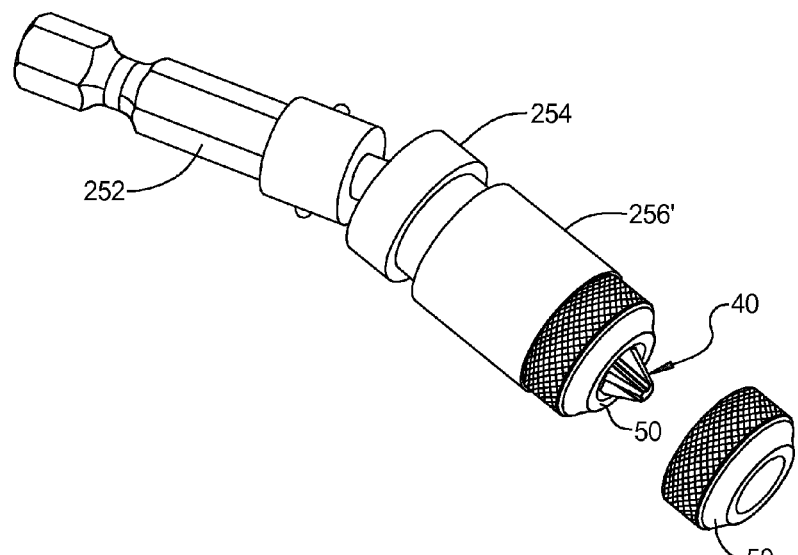
FIG. 21 is an alternative pivotal bit holder accessory having a ring magnet mounted to a floating locking sleeve of the accessory, according to the principles of the present disclosure.
Figure 22:
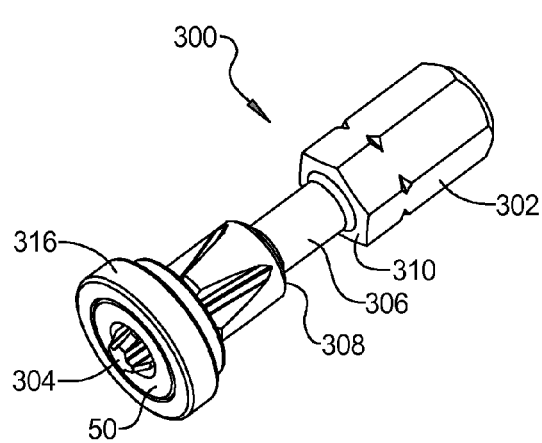
FIG. 22 is a perspective view of a tool bit having a magnetic ring supported by a floating sleeve, according to the principles of the present disclosure.
Figure 23:
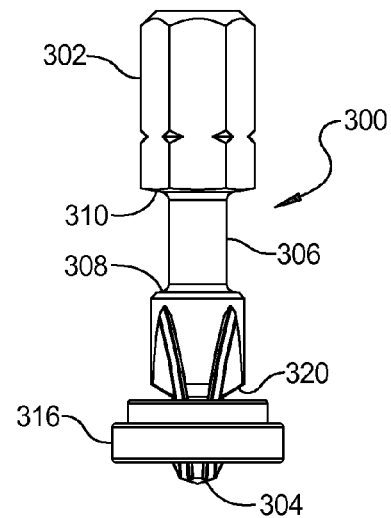
FIG. 23 is a side plan view of the tool bit and floating sleeve shown in FIG. 22.

As an alternative, as illustrated in FIG. 21, the ring magnet 50 can be secured to the front end of the locking sleeve 256' which can be allowed to float in a forward direction to allow the ring magnet 50 to engage a fastener secured to the tool bit 40 received in a bore in the driven component 254 of the tool holder. FIG. 21 illustrates the pivoting arrangement between the driving component and the driven component which, again, is detailed in U.S. Pat. No. 7,942,426, which is herein incorporated by reference in its entirety.

With reference to FIGS. 22-25, a tool bit 300 having a floating ring magnet 50, according to the principles of the present disclosure, will now be described. The tool bit 300 includes a shaft having a hex-shaped shank 302 at a first end, and a working region 304 disposed at a second end. The shaft can have a section between the hex-shaped shank 302 and the working region 304 that has a reduced diameter region 306 that is disposed between two shoulders 308, 310. The reduced diameter region 306 provides a torsion zone that allows the shaft to twist to absorb forces while the tool bit 300 is being used to drive a fastener. A tool bit 300 having a torsion zone of this type is generally known in the art as disclosed by U.S. Pat. No. 5,704,261.

Figure 24:
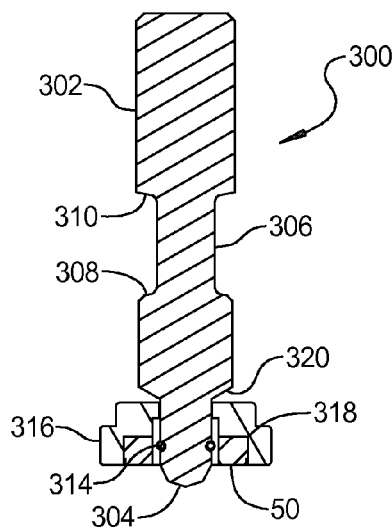
FIG. 24 is a cross-sectional view of the tool bit and floating sleeve shown in FIGS. 22 and 23.
Figure 25:
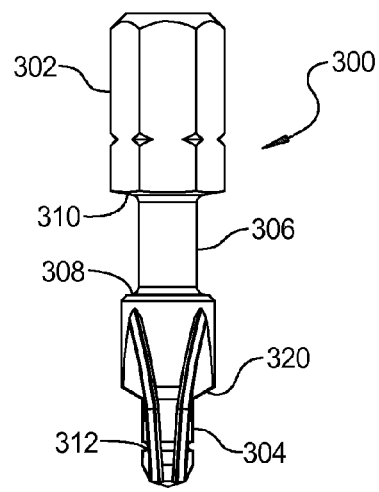
FIG. 25 is a side plan view of the tool bit shown in FIG. 22.
Figure 26:
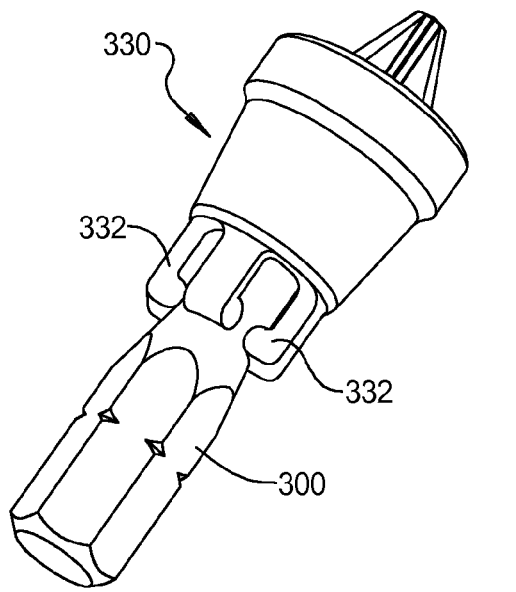
FIG. 26 is a perspective view of the tool bit with a floating sleeve, according to the principles of the present disclosure.
Figure 27:
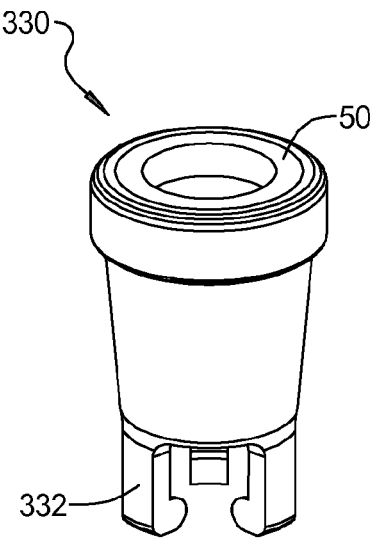
FIG. 27 is a perspective view of the floating sleeve shown in FIG. 26.

As illustrated in FIGS. 24 and 25, the working region 304 of the tool bit 300 can be provided with various types of drive heads such as Phillips, flat, hex, square, and other known types of drive heads. A recessed groove 312 is provided in the working region 304 for receiving a retainer ring 314 therein. A ring magnet 50 is supported by a sleeve 316 that is retained on the tool bit 300 by the retainer ring 314 that is received within the recessed groove 312. As the tool bit 300 is engaged with a fastener, the floating sleeve 316 is moved in a forward direction to allow the ring magnet 50 to engage the fastener to assist in retaining the fastener to the tool bit 300. The floating sleeve 316 includes an interior shoulder 318 that engages the retainer 314 to limit the sleeve's forward axial travel. The tool bit 300 includes a shoulder 320 at an end of the working region 304 that limits the axial travel of the floating sleeve 316 in the opposite direction. The floating sleeve 316 can optionally be removed from the tool bit 300 by pulling on the floating sleeve 316 in an axial direction to overcome the retainer 314. The retainer 314 can be a rubber O-ring or a steel hog ring that can be flexed inward when the floating sleeve 316 is either inserted onto or pulled off of the tool bit 300.

Figure 28:
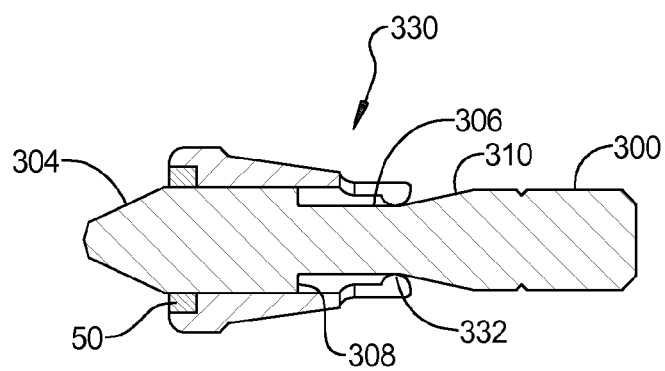
FIG. 28 is a cross-sectional view of the tool bit and floating sleeve shown in FIG. 26.
Figure 29:
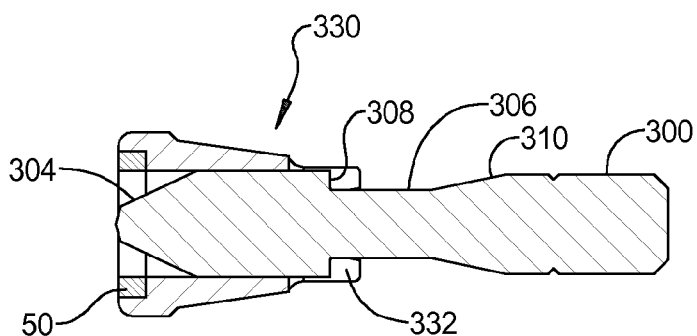
FIG. 29 is a cross-sectional view similar to FIG. 28, with the floating sleeve in a forward position, according to the principles of the present disclosure.

With reference to FIGS. 26-29, an alternative arrangement for mounting a ring magnet 50 to a tool bit 300 such as the tool bit as described above, will now be described. The ring magnet 50 is supported by a floating sleeve 330 that is slidably received on a forward end of the tool bit 300. The floating sleeve 330 includes a plurality of axially extending fingers 332 that are integrally formed with the sleeve 330 and releasably engage the reduced diameter region of the tool bit between the two shoulders 308, 310. FIG. 28 illustrates the floating sleeve 330 in a rearward position, while FIG. 29 illustrates the floating sleeve 330 in a forward position for the ring magnet 50 to engage a fastener to help retain the fastener on the tool bit 300. The floating sleeve 330 can be removed from the tool bit by pulling forward on the floating sleeve 330, thus causing the fingers 332 to flex radially outward over top of the increased diameter portion at the head 304 of the tool bit 300. It is noted that the floating sleeve 330 can be made from plastic, rubber, or other materials that allow flexibility of the fingers 332. The ring magnet 50 can be secured to the floating sleeve 330 by adhesives, in-molding, or other known fastening techniques.

Figure 30:
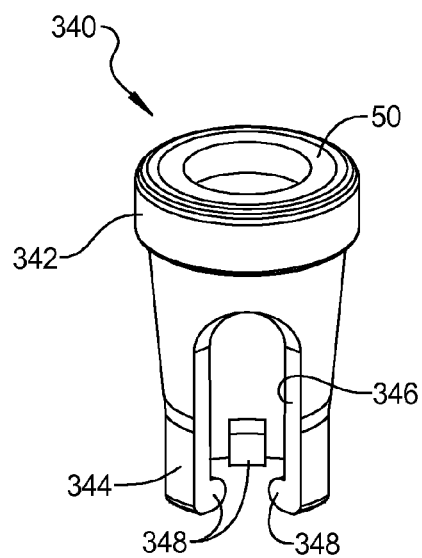
FIG. 30 is a perspective view of an alternative floating sleeve design, according to the principles of the present disclosure.
Figure 31:
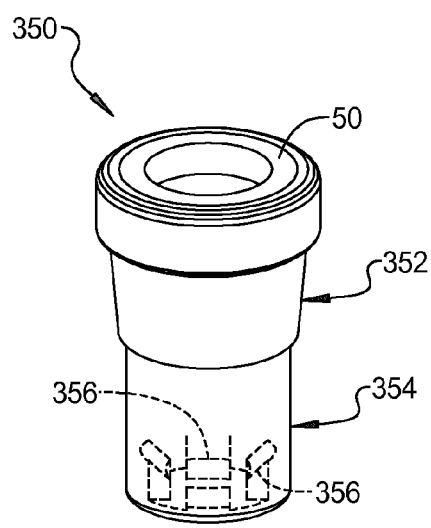
FIG. 31 is a perspective view of a floating sleeve according to an alternative embodiment of the present disclosure.

With reference to FIG. 30, an alternative floating sleeve 340 design is shown for supporting a ring magnet 50 that can be received on a tool bit 300. The sleeve 340 includes a first end 342 supporting the ring magnet 50 and a second end 344 including a single elongated slot 346 that allows the second end 344 of the sleeve 340 to flex outward for insertion of a tool bit 300 therein. The interior of second end 344 of the sleeve 340 includes a plurality of radially inwardly extending tabs 348 that are received in the reduced diameter portion 306 of the tool bit 300 and engage the forward and rearward shoulders 308, 310 to limit axial movement of the sleeve 340 along the length of the tool bit 300. The floating sleeve 340 can be made from plastic or rubber With reference to FIG. 31, a floating sleeve 350, according to an alternative embodiment, can include a plastic cup 352 that receives the ring magnet 50 at a forward end thereof and a rubber sleeve 354 at a rearward end thereof. The interior surface of the rubber sleeve 354 includes a plurality of radially inwardly extending tabs 356 at its rearward end, as illustrated in phantom in FIG. 31. The radially inwardly extending tabs 356 are flexible to allow a tool bit 300 to be inserted into the sleeve 350 so that the tabs 356 engage the reduced diameter portion 306 between the forward and rearward shoulders 308, 310 of the tool bit 300. Thus, the sleeve 350 is allowed to float in a forward and rearward direction in the manner as described with regard to the above described embodiments.

Figure 32:
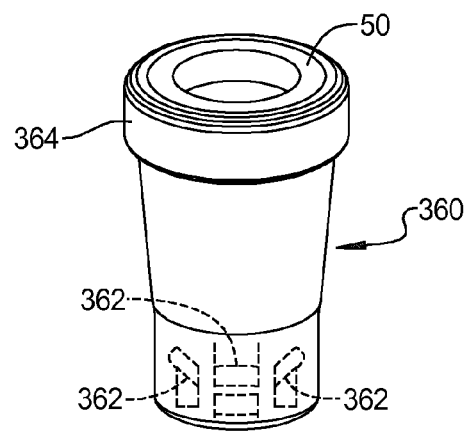
FIG. 32 is a perspective view of a floating sleeve according to the present disclosure.
Figure 33:
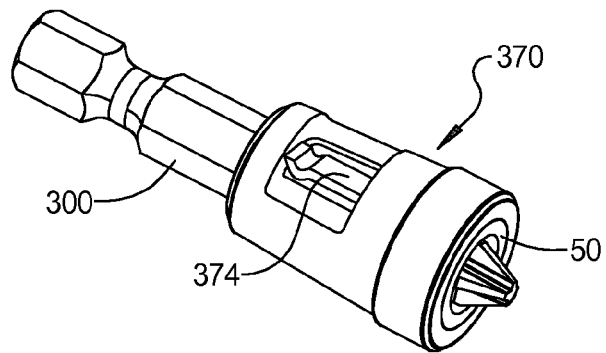
FIG. 33 is a perspective view of a tool bit having a floating sleeve, according to an alternative embodiment of the present disclosure.
Figure 34:
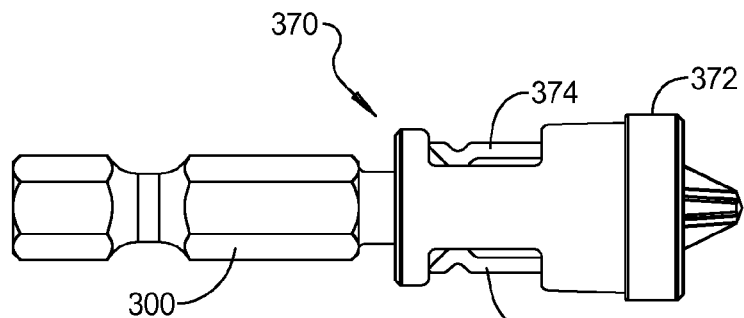
FIG. 34 is a side plan view of the tool bit and floating sleeve shown in FIG. 33.
Figure 35:
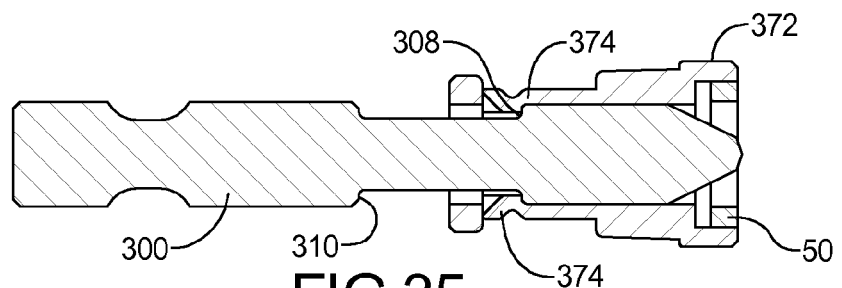
FIG. 35 is a cross-sectional view of the tool bit and floating sleeve shown in FIG. 33.
Figure 36:
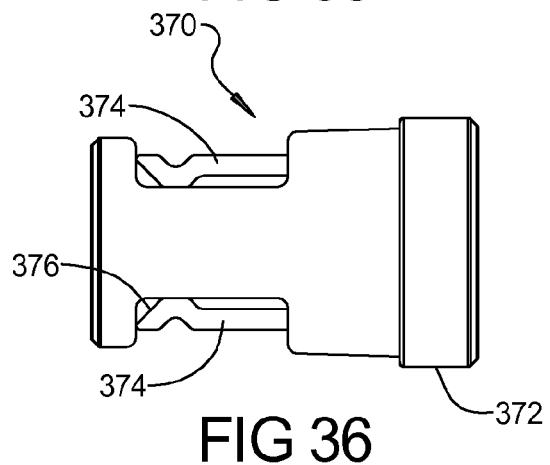
FIG. 36 is a side plan view of the floating sleeve shown in FIG. 33.

With reference to FIG. 32, an alternative floating sleeve 360 design is provided in which a floating ring magnet 50 is supported at a first end of a rubber sleeve 360. The second end of the sleeve includes a plurality of radially inwardly extending tabs 362 that are flexible to allow a tool bit 300 to be inserted into the sleeve 360 wherein the tabs 362 are disposed in the reduced diameter portion 306 between the forward and rearward shoulders 308, 310 of the tool bit 300. The ring magnet 50 can be reinforced with a metal or plastic cap 364 disposed between the ring magnet 50 and the first end of the rubber sleeve 360.

With reference to FIGS. 33-36, an alternative floating sleeve 370 is provided for supporting a ring magnet 50 in a forward end 372 thereof. The floating sleeve 370 can be made from plastic and can include one or more flexible fingers 374 that engage the reduced diameter portion 306 of the tool bit 300 between the forward and rearward shoulders 308, 310 thereof. The fingers 374 can include a radially inwardly protruding end portion 376 that engages the reduced diameter portion 306 of the tool bit 300. The elongated fingers 374 are integrally formed with the plastic sleeve 370 to allow the fingers 374 to flex radially outward when a tool bit 300 is inserted therein or removed therefrom.

Figure 37:
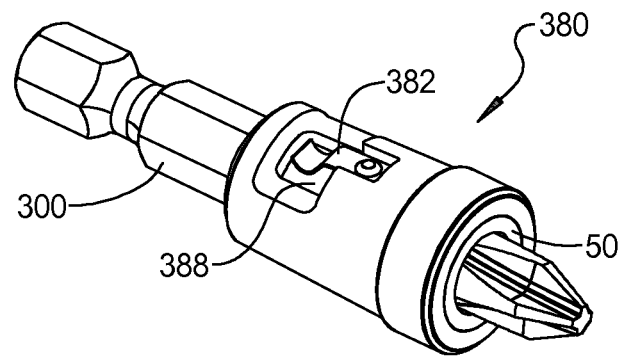
FIG. 37 is a perspective view of a tool bit and an alternative floating sleeve, according to the present disclosure.
Figure 38:
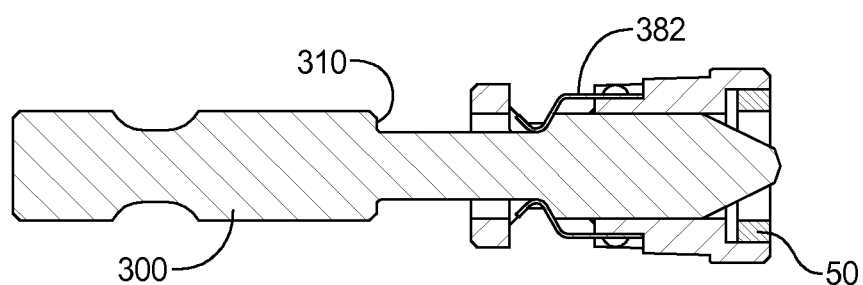
FIG. 38 is a cross-sectional view of the tool bit and floating sleeve shown in FIG. 37.
Figure 39:
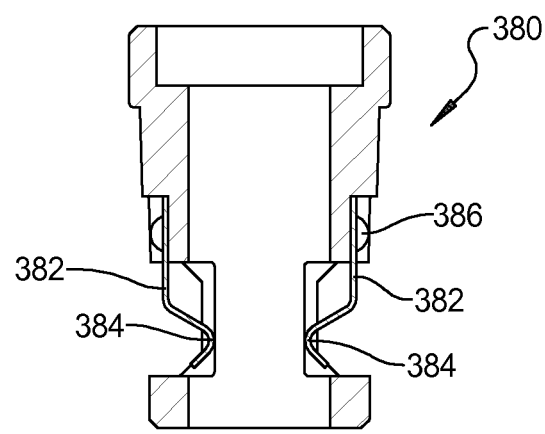
FIG. 39 is a cross-sectional view of the floating sleeve shown in FIG. 37.

With reference to FIGS. 37-39, an alternative arrangement of a floating sleeve 380 is provided wherein the flexible fingers 382 are made from a spring steel and are separately attached to the floating sleeve 380 which can be made from plastic or metal. The flexible fingers 382 operate in the same manner as the fingers 374 disclosed in FIGS. 33-36 to retain the floating sleeve 380 onto a tool bit 300 while allowing the sleeve 380 to float in a forward and rearward direction until the fingers 382 engage the forward or rearward shoulders 308, 310 of the tool bit 300. The fingers 382 include radially inwardly protruding portions 384 that engage the reduced diameter portion 306 of the tool bit 300. The flexible fingers 382 can be secured to the sleeve 380 by a rivet 386 or can be in-molded into the sleeve 380. The sleeve 380 includes a pair of opposing windows 388 to receive the fingers 382.

Figure 40:
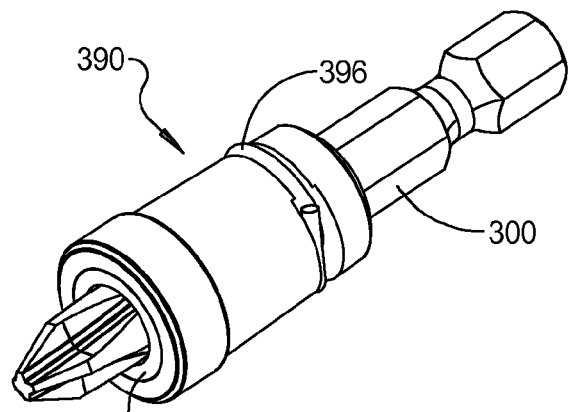
FIG. 40 is a perspective view of a tool bit and alternative floating sleeve design, according to the present disclosure.
Figure 41:
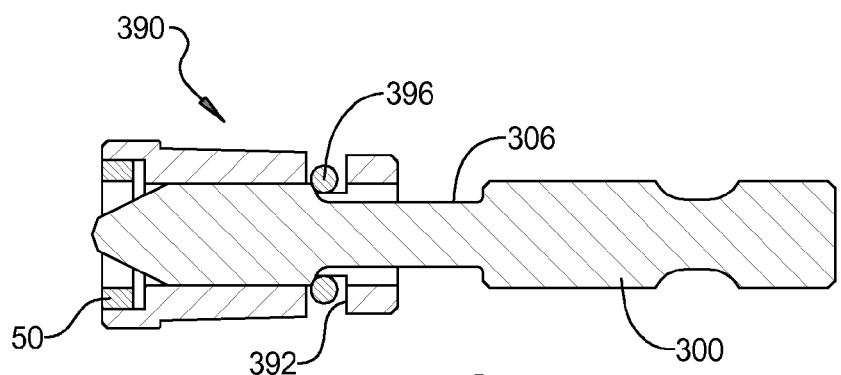
FIG. 41 is a cross-sectional view of the tool bit and floating sleeve shown in FIG. 40.
Figure 42:
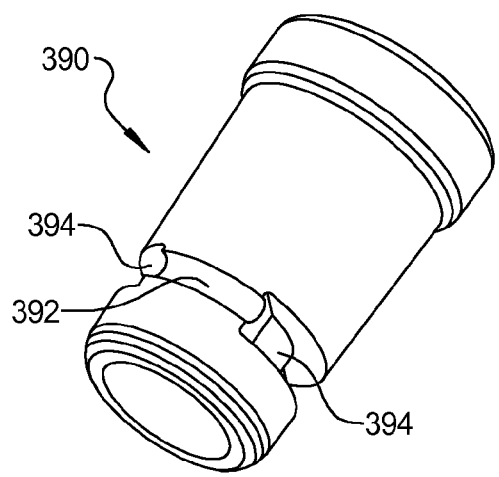
FIG. 42 is a perspective view of the floating sleeve shown in FIG. 40.
Figure 43:
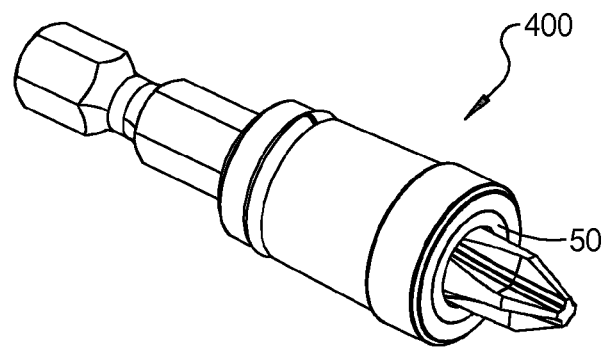
FIG. 43 is a perspective view of a tool bit having a floating ring magnet supported by a floating sleeve, according to a further embodiment of the present disclosure.
Figure 44:
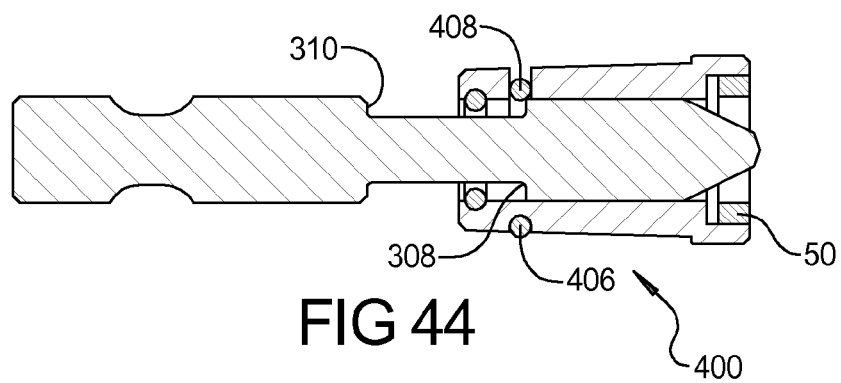
FIG. 44 is a cross-sectional view of the tool bit and floating sleeve shown in FIG. 43.
Figure 45:
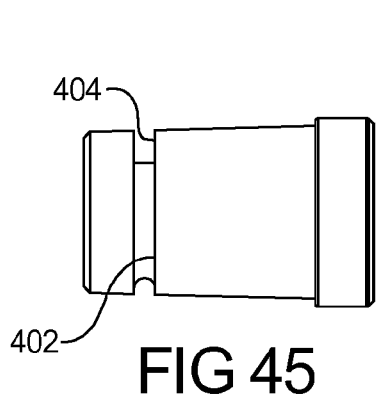
FIG. 45 is a side plan view of the floating sleeve shown in FIG. 43.

With reference to FIGS. 40-42, an alternative floating sleeve 390 is provided for supporting a ring magnet 50 in a forward end thereof. The floating sleeve 390 can be made from plastic, rubber, or metal and can include a recessed annular groove 392 on an exterior surface thereof as well as a pair of oppositely disposed windows 394 that extend from the groove 392 into the interior of the sleeve 390. A rubber O-ring or a hog ring 396 can be provided in the annular groove 392 so as to extend into the window portion 394 of the annular sleeve 390 in such a manner that the O-ring or hog ring 396 can be received in the reduced diameter portion 306 of the tool bit 300 between the forward and rearward shoulders 308, 310 thereby retaining the floating sleeve 390 onto the tool bit 300. The reduced diameter portion 306 of the tool bit allows the floating sleeve 390 to move in a forward and rearward direction to allow the ring magnet 50 to engage a fastener for securing the fastener to the tool bit 300.

Figure 46:
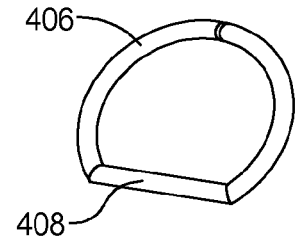
FIG. 46 is a perspective view of a D-shaped ring utilized with the floating sleeve shown in FIG. 45.
Figure 47:
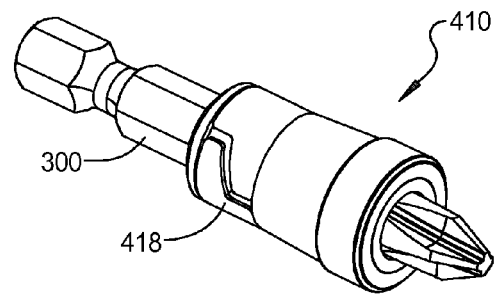
FIG. 47 is a perspective view of a tool bit and alternative floating sleeve design according to the present disclosure.
Figure 48:
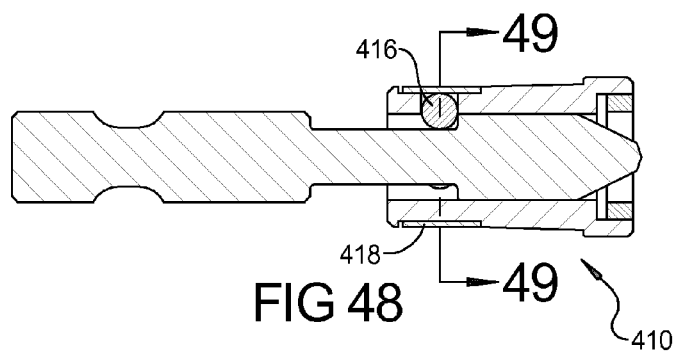
FIG. 48 is a cross-sectional view of the tool bit and floating sleeve shown in FIG. 47.
Figure 49:
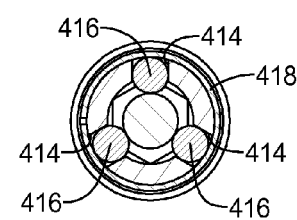
FIG. 49 is a cross-sectional view taken along line 49-49 of FIG. 48.
Figure 50:
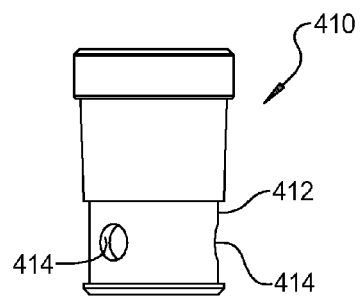
FIG. 50 is a side plan view of the floating sleeve shown in FIG. 47.
Figure 51:
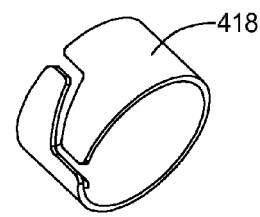
FIG. 51 is a perspective view of a spring band utilized in the embodiment of FIG. 47.

With reference to FIGS. 43-46, a still further alternative embodiment of the floating sleeve 400 is shown wherein the floating sleeve 400 supports a ring magnet 50 at a forward end and includes an exterior annular groove 402 with an opening 404 on one side that communicates to the interior of the sleeve 400. The annual groove 402 receives a D-shaped ring 406 having a generally flat portion 408 along one side thereof that is received in the window opening 404 of the annular groove 402 so that it communicates to the interior of the sleeve 400. The flat portion 408 of the D-shaped ring 406, as shown in FIG. 46, is received in the reduced diameter portion 306 of the tool bit 300 between the forward and rearward shoulders 308, 310 to limit the axial movement of the floating sleeve 400 in the forward and rearward directions.

With reference to FIGS. 47-51, an alternative arrangement of the floating sleeve 410, according to the principles of present disclosure, will now be described. The floating sleeve 410 includes an elongated annular recess 412 on an outer surface thereof and a plurality of window openings 414 extending therethrough within the elongated annular recess 412. The openings 414 each receive a ball 416 therein and a spring band 418 is received within the elongated annular recess 412 over top of the balls 416 to secure the balls 416 within the openings 414. The balls 416 are designed to be received in the reduced diameter portion 306 of the tool bit 300 between the forward and rearward shoulders 308, 310 to limit the axial movement of the floating sleeve 410 in the forward and rearward directions. During insertion of the tool bit 300 into the floating sleeve 410, the spring band 418 allows the balls 414 to be pushed radially outward against the spring force of the band 418 while the head of the tool bit 300 is inserted into, or removed from, the sleeve 410. As the balls 416 reach the reduced diameter portion 306, the balls 416 move radially inward reducing the force of the spring band 418 on the balls 414. It is intended that the balls 414 provide an interference when engaging the forward and rearward shoulders 308, 310 of the reduced diameter portion 306, but do not provide significant resistance to the floating motion of the sleeve 410 along the tool bit 300.

Figure 52:
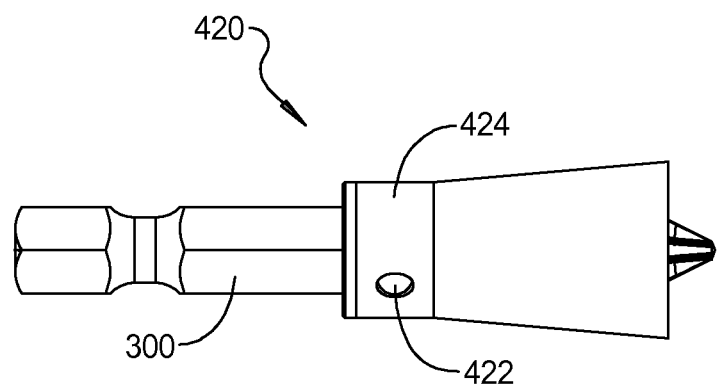
FIG. 52 is a side plan view of a tool bit having a floating sleeve according to an alternative embodiment.
Figure 53:
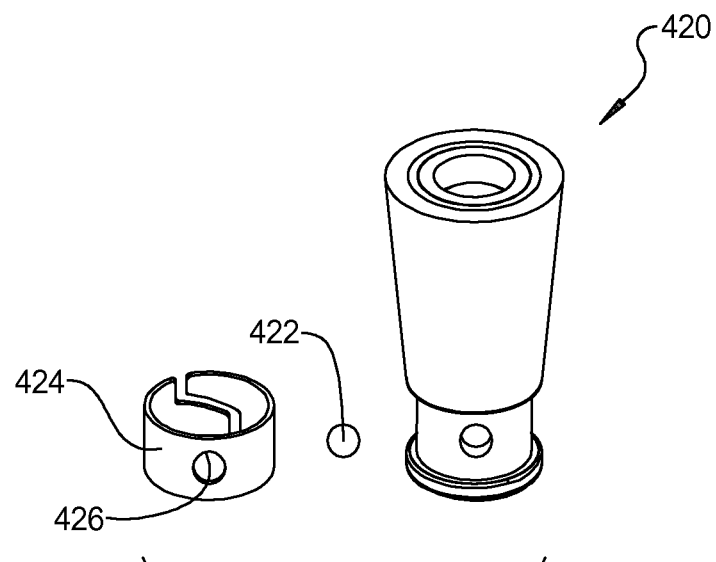
FIG. 53 is an exploded perspective view of the floating sleeve, ball, and spring band utilized in the embodiment of FIG. 52.

With reference to FIGS. 52 and 53, an alternative floating sleeve 420 is shown utilizing a single ball 422 wherein the spring band 424 is provided with an opening 426 therein for maintaining the position of the spring band 424 relative to the ball 422 that is received in the single opening 426 of the floating sleeve 420.

Figure 54:
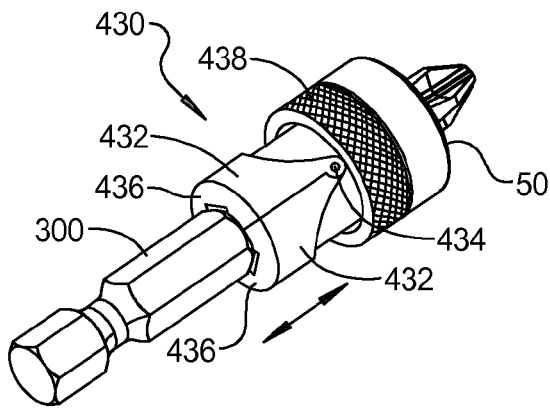
FIG. 54 is a perspective view of a tool bit and alternative floating sleeve design, according to the principles of the present disclosure.
Figure 55:
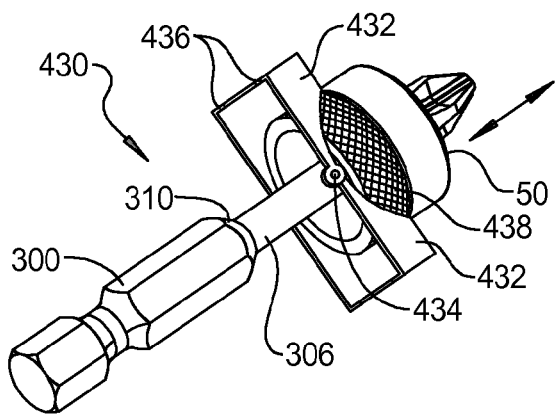
FIG. 55 is a perspective view of the floating sleeve design as shown in FIG. 54 with the locking jaws in a disengaged position.
Figure 56:
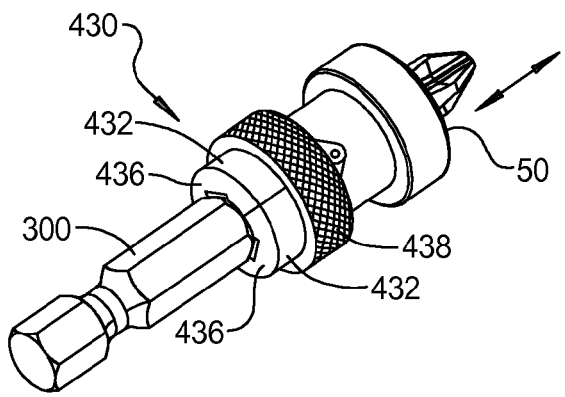
FIG. 56 is a perspective view of the floating sleeve design shown in FIG. 54 with the lock collar shown in the locked position for engaging the floating sleeve to the tool bit.

With reference to FIGS. 54-56, an alternative floating sleeve 430, according to the principles of present disclosure, will now be described. The floating sleeve 430 supports a ring magnet 50 at a forward end thereof and includes a pair of lock jaws 432 that are pivotally mounted to the floating sleeve by pivots 434. The lock jaws 432 each include radially inwardly extending tabs 436 that are designed to be engaged within the reduced diameter portion 306 of the tool bit 300. The lock jaws 432 can be pivoted to an engaged position, as illustrated in FIG. 54, and a lock collar 438 can be pulled over top of the lock jaws 432, as illustrated in FIG. 56, to secure the lock jaws 432 to the tool bit 300. The ring magnet 50 is supported at the forward end of the floating sleeve 430 and the lock jaws 432 limit the axial movement of the floating sleeve 430 along the tool bit 300 to allow the ring magnet 50 to float to an engaged position when the tool bit 300 is engaged with a fastener. In order to remove the sliding sleeve 430 from the tool bit 300, the lock collar 438 can be pulled in a forward position allowing the lock jaws 432 to be pivoted radially outward so that the tool bit 300 can be removed from the floating sleeve 430. It is noted that the lock collar 438 can be made of a flexible material, or can have a rigid outer ring with a flexible material on the interior thereof that allows the lock collar 438 to be retained on the lock jaws 432 when they are in the locked position.

Figure 57:
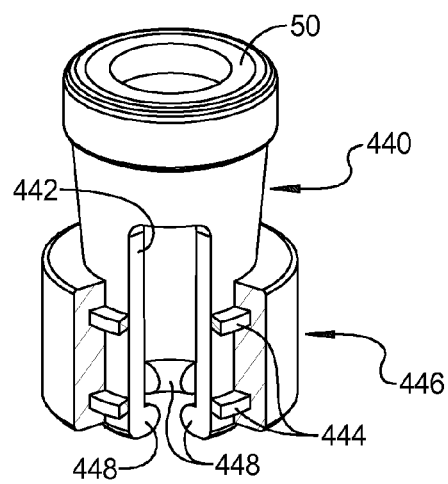
FIG. 57 is a partial cutaway perspective view of an alternative floating sleeve design according to the present disclosure.

With reference to FIG. 57, an alternative floating sleeve 440 is shown including a ring magnet 50 at a forward end of a plastic sleeve. The plastic sleeve 440 has a slot 442 therein and has exterior cam surfaces 444 thereon. A rotating sleeve 446 is engaged with the cam surfaces 444 of the sleeve 440 and the rotating sleeve 446 can be rotated to cause plastic sleeve 440 to be retained in a radially inward direction to positively engaged the radially inwardly extending tabs 448 of the sleeve 440 within the reduced diameter portion 306 of the tool bit 300 between the forward and rearward shoulders 308, 310 thereof. The rotating sleeve 446 can also be rotated to an unlocking position that allows the sleeve 440 to flex outwardly sufficiently enough to allow removal of the bit 300 from the floating sleeve 440.

Figure 58:
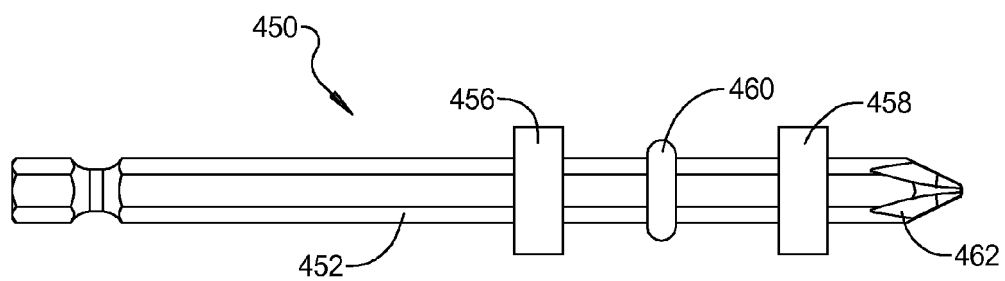
FIG. 58 is a side plan view of a pair of ring magnets disposed around a tool bit with a connecting sleeve removed for illustrative purposes, according to the principles of the present disclosure.
Figure 59:
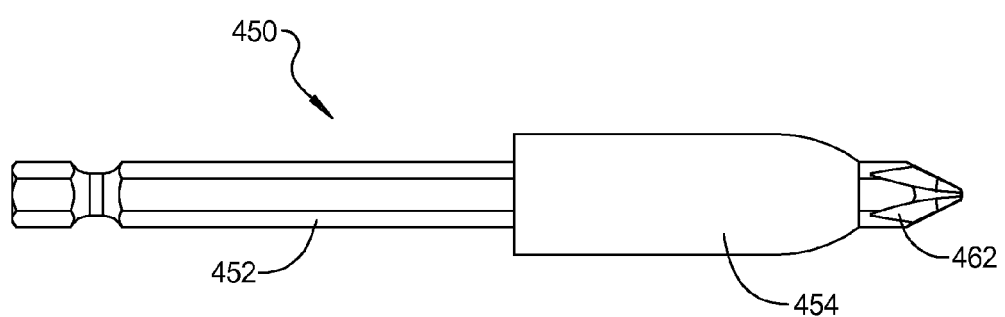
FIG. 59 illustrates a sleeve that is mounted to the pair of ring magnets as shown in FIG. 58.

With reference to FIGS. 58 and 59, a further embodiment of the present disclosure will now be described. With this embodiment, the use of a tool bit 450 having a hex-shaped shaft 452 without a reduced diameter portion is provided. A floating sleeve 454 is provided with two interior ring magnets 456, 458 (as illustrated in FIG. 58 with the sleeve 454 removed) which are positioned with both poles opposing one another at approximately 10 mm apart. With both poles of the ring magnets 456, 458 opposing one another, the sleeve 454 will move freely along a length of the tool bit 452 as they are captured by the non-magnetic sleeve 454. An O-ring 460 can optionally be placed between the two magnets 456, 458 to provide resistance to movement of the floating sleeve 454 if so desired. The opposing poles of the magnets 456, 458 cause the sleeve 454 to float on the bit 450 until a face of the forward magnet 458 contacts a head of a fastener that has been placed on the driving end 462 of the tool bit 450. Once that contact is made, the sleeve 454 then positions itself such that the fastener remains in place on the bit 450 during installation. Once the faster is securely started, the sleeve 454 can be drawn back onto the bit 450 if desired where it will remain during the driving and seating of the fastener.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A fastener tool assembly comprising:
 a body having a shank at its rearward end and a coaxial non-circular socket formed at a second end to allow a non-circular shank of a tool bit to be non-rotatably received therein;
 a retainer received in the body and moveable between a first position in which the retainer is configured to engage a tool bit received in the socket to retain the tool bit in the socket and a second position in which the retainer enables removal of the tool bit from the socket;
 a collar slidably disposed on the body;
 a spring biasing the collar axially forwardly; and
 a magnet disposed at a forward end of the collar to magnetize a fastener engaged by a tool bit received in the socket, wherein the collar is axially moveable among a rearward position in which the retainer is allowed to move to the second position, a neutral position in which the retainer is held in the first position, and a forward position in which the retainer is held in the first position and the magnet is positioned to magnetize a fastener being driven by a tool bit received in the socket.

2. The fastener tool assembly of claim 1, wherein the spring biases the collar forwardly from the rearward position to the neutral position.

3. The fastener tool assembly of claim 2, wherein the collar floats freely from the neutral position to the forward position.

4. The fastener tool assembly of claim 1, wherein the magnet has a ring shape.

5. The fastener tool assembly of claim 1, wherein the retainer comprises a clip that is received in an angled slot formed in the body in communication with the socket and that is biased toward the first position by the spring.

6. The fastener tool assembly of claim 1, wherein the retainer comprises a clip that is received in an angled slot formed in the body in communication with the socket and that is biased toward the first position by the spring.

7. A fastener tool assembly comprising:
a fastener driving tool having a reduced diameter outer portion formed between a front shoulder and a rear shoulder;
a sliding sleeve receivable over the fastener driving tool;
at least one ball projecting radially inwardly from the sleeve to be received in the reduced diameter outer portion of the fastener driving tool; and
a magnet coupled to a front end of the sliding sleeve,
wherein the sliding sleeve is moveable between a rearward position where the at least one ball engages the rear shoulder of the fastener driving tool and a forward position where the magnet is positioned to magnetize a fastener being driven by the fastener driving tool, and
wherein the fastener driving tool comprises a tool bit holder having a generally cylindrical body in which the reduced diameter portion is formed and a socket defined in the body and open to a front end of the body, the socket configured to receive a tool bit therein.

8. The fastener tool assembly of claim 7, wherein the at least one ball comprises a single ball.

9. The fastener tool assembly of claim 7, wherein the at least one ball comprises three balls.

10. The fastener tool assembly of claim 7, further comprising a spring band surrounding the at least one ball to bias the at least one ball in a radial inward direction.

11. The fastener tool assembly of claim 7, wherein the magnet has a ring shape.

12. A fastener tool assembly comprising:
a fastener driving tool having a reduced diameter outer portion disposed between a front shoulder and a rear shoulder;
a sliding sleeve receivable over the fastener driving tool;
at least one flexible finger extending radially inwardly from the sleeve to be received in the reduced outer diameter portion of the fastener driving tool; and
a magnet coupled to a front end of the sliding sleeve,
wherein the sliding sleeve is moveable between a rearward position where the flexible finger engages the rear shoulder of the fastener driving tool and a forward position where the magnet is positioned to magnetize a fastener being driven by the fastener driving tool.

13. The fastener tool assembly of claim 12, wherein the flexible finger includes a protrusion that engages the rear shoulder in the rearward position.

14. The fastener tool assembly of claim 12, wherein the flexible finger is configured to flex radially outward when the fastener driving tool is inserted into or removed from the sliding sleeve.

15. The fastener tool assembly of claim 12, wherein the flexible finger is integrally formed with the sleeve.

16. The fastener tool assembly of claim 12, wherein the flexible finger is separately attached to the sliding sleeve.

17. The fastener tool assembly of claim 12, wherein the fastener driving tool comprises a shaft in which the reduced diameter portion is formed and a fastener driving head coupled to a front end of the shaft, the reduced diameter portion providing a torsion zone that allows the shaft to twist to absorb forces while the fastener driving head is being used to drive a fastener.

18. The fastener tool assembly of claim 12, wherein the fastener driving tool comprises a tool bit holder having a generally cylindrical body in which the reduced diameter portion is formed and a socket defined in the body and open to a front end of the body, the socket configured to receive a tool bit therein.

19. A fastener tool assembly comprising:
a body having a shank at its rearward end and a coaxial socket formed at a second end to allow a polygonal shank of a tool bit to be non-rotatably received therein;
a retainer received in the body and moveable between a first position in which the retainer is configured to engage a tool bit received in the socket to retain the tool bit in the socket and a second position in which the retainer enables removal of the tool bit from the socket;
a collar slidably disposed on the body;
a spring configured to bias the collar axially forwardly when the spring is compressed; and
a magnet disposed at a forward end of the collar to magnetize a fastener engaged by a tool bit received in the socket,
wherein the collar is axially moveable among a rearward position in which the retainer is allowed to move to the second position while the spring is compressed, a neutral position in which the retainer is held in the first position while the spring is not compressed, and a forward position in which the retainer is held in the first position and the magnet is positioned to magnetize a fastener being driven by a tool bit received in the socket.

20. The fastener tool assembly of claim 19, wherein the collar floats freely from the neutral position to the forward position.

21. The fastener tool assembly of claim 19, wherein the magnet has a ring shape.

22. A fastener tool assembly comprising:
a body having a shank at its rearward end and a coaxial non-circular socket formed at a second end to allow a non-circular shank of a tool bit to be inserted therein, the body having an opening formed in the body in communication with the socket;
a retraction collar slidably disposed on the body and having a forward end extending axially forward of the second end of the body;
a coil spring biasing the retraction collar forwardly;
a retainer held in a bottom of the opening formed in the body by one of the retraction collar and the coil spring, wherein the tool bit is removed by sliding the retraction collar rearwardly, to compress the coil spring and allow the retainer to retract back up the opening; and a ring magnet supported on the forward end of the retraction collar to magnetize a fastener to retain the fastener to the tool bit.

23. The fastener tool assembly of claim 22, wherein the ring magnet is attached directly to the retraction collar.

24. The fastener tool assembly of claim 22, wherein the ring magnet is attached to a forward collar received on and movable with the retraction collar.

25. The fastener tool assembly of claim 24, wherein the forward collar is removably received directly on the retraction collar.

26. The fastener tool assembly of claim 22, wherein the opening in the body is an angular slot formed in the body and the coil spring biases the retainer toward a bottom of the angular slot.

* * * * *